US010785472B2

(12) United States Patent
Kobayashi

(10) Patent No.: US 10,785,472 B2
(45) Date of Patent: Sep. 22, 2020

(54) DISPLAY APPARATUS AND METHOD FOR CONTROLLING DISPLAY APPARATUS

(71) Applicant: SEIKO EPSON CORPORATION, Tokyo (JP)

(72) Inventor: Shinichi Kobayashi, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 151 days.

(21) Appl. No.: 15/830,507

(22) Filed: Dec. 4, 2017

(65) Prior Publication Data

US 2018/0176547 A1 Jun. 21, 2018

(30) Foreign Application Priority Data

Dec. 19, 2016 (JP) .................. 2016-245704

(51) Int. Cl.

| H04N 13/332 | (2018.01) |
|---|---|
| G06F 3/01 | (2006.01) |
| H04N 13/344 | (2018.01) |
| H04N 13/398 | (2018.01) |
| H04N 13/279 | (2018.01) |
| H04N 13/366 | (2018.01) |
| G06F 1/16 | (2006.01) |

(52) U.S. Cl.
CPC .......... *H04N 13/332* (2018.05); *G06F 1/163* (2013.01); *G06F 3/011* (2013.01); *G06F 3/012* (2013.01); *H04N 13/279* (2018.05); *H04N 13/344* (2018.05); *H04N 13/366* (2018.05); *H04N 13/398* (2018.05)

(58) Field of Classification Search
CPC .. H04N 13/332; H04N 13/279; H04N 13/344; H04N 13/366; H04N 13/398; G06F 3/012
USPC ................... 345/8, 619; 348/14.07; 600/411; 382/103
See application file for complete search history.

(56) References Cited

U.S. PATENT DOCUMENTS

| 6,437,794 B1 * | 8/2002 | Ohshima ................. G06F 3/011 345/619 |
| 6,681,151 B1 * | 1/2004 | Weinzimmer ......... B25J 9/1697 219/121.85 |
| 7,893,935 B1 * | 2/2011 | Neely, III ............... G06F 3/012 345/419 |
| 9,857,876 B2 * | 1/2018 | Hare ....................... G06F 3/017 |

(Continued)

FOREIGN PATENT DOCUMENTS

JP 2016-149002 A 8/2016

*Primary Examiner* — Prabodh M Dharia
(74) *Attorney, Agent, or Firm* — Oliff PLC

(57) ABSTRACT

An HMD includes a six-axis sensor, a magnetic sensor, and a head motion detecting section that detect at least one of the position and motion of a head, a reference setting section that sets a reference state based on at least one of the head position and motion detected by the head motion detecting section, and a display controlling section that changes the display state of a content displayed by the display section based on changes in the position and motion of the head with respect to those in the reference state. The content is formed of a plurality of contents, and the display controlling section changes the display state of the contents displayed by an image display section in such a way that the relative display positions of the contents are maintained.

22 Claims, 15 Drawing Sheets

(56) References Cited

U.S. PATENT DOCUMENTS

| | | | |
|---|---|---|---|
| 2008/0024594 A1* | 1/2008 | Ritchey | H04N 5/2259 348/36 |
| 2009/0147993 A1* | 6/2009 | Hoffmann | G02B 27/0093 382/103 |
| 2011/0304540 A1* | 12/2011 | Nishimoto | A63F 13/42 345/158 |
| 2012/0066640 A1* | 3/2012 | Kwak | G06F 9/451 715/788 |
| 2012/0188148 A1* | 7/2012 | DeJong | G02B 27/0093 345/8 |
| 2013/0278631 A1* | 10/2013 | Border | G02B 27/017 345/633 |
| 2015/0022447 A1* | 1/2015 | Hare | G06F 3/0304 345/158 |
| 2015/0153826 A1* | 6/2015 | Ballard | H04W 76/10 345/633 |
| 2015/0208981 A1* | 7/2015 | Oh | G01R 33/283 600/411 |
| 2015/0324692 A1* | 11/2015 | Ritchey | A61B 5/686 348/14.08 |
| 2015/0370072 A1* | 12/2015 | Lee | G02B 27/0172 345/8 |
| 2016/0018887 A1* | 1/2016 | Tsukahara | G06F 1/1694 345/8 |
| 2016/0085403 A1* | 3/2016 | Koga | G06F 3/0485 345/684 |
| 2016/0139787 A1* | 5/2016 | Joo | G06F 3/1423 715/765 |
| 2016/0170482 A1* | 6/2016 | Yajima | G06F 3/012 345/8 |
| 2016/0182854 A1* | 6/2016 | Suzuki | H04N 7/147 348/14.07 |
| 2016/0282619 A1* | 9/2016 | Oto | G02B 27/017 |
| 2017/0061034 A1* | 3/2017 | Ritchey | A61B 5/4064 |
| 2017/0090556 A1 | 3/2017 | Baba et al. | |
| 2017/0153672 A1* | 6/2017 | Shin | G02B 27/0176 |
| 2017/0155885 A1* | 6/2017 | Selstad | H04N 13/344 13/344 |
| 2017/0168651 A1* | 6/2017 | Ikeda | G06F 3/011 |
| 2017/0206673 A1* | 7/2017 | Kawamoto | G06T 7/70 |
| 2017/0256125 A9* | 9/2017 | Kelly | G07F 17/3211 |
| 2017/0318235 A1* | 11/2017 | Schneider | G06K 9/3233 |
| 2017/0363867 A1* | 12/2017 | Poulos | G02B 27/0103 |
| 2018/0374192 A1* | 12/2018 | Kunkel | G06T 15/205 |

\* cited by examiner

DISPLAY APPARATUS AND METHOD FOR CONTROLLING DISPLAY APPARATUS

BACKGROUND

1. Technical Field

The present invention relates to a display apparatus and a method for controlling the display apparatus.

2. Related Art

There is a known display apparatus that includes a display section worn on a user's head and allows the user to visually recognize an image (see JP-A-2016-149002, for example).

JP-A-2016-149002 discloses an apparatus that produces a plurality of virtual displays arranged in a three-dimensional virtual space, selects one of the virtual displays in accordance with the head's motion detected with a detector, and reproduces a content related to the selected virtual display.

The apparatus disclosed in JP-A-2016-149002 produces the plurality of virtual displays in such a way that they are arranged in the three-dimensional virtual space. When the number of arranged virtual displays increases, it is difficult in some cases for the user to select a virtual display on which a content that the user desires to view is displayed. Further, in a case where the plurality of virtual displays are arranged in front of the user, contents displayed in front of the user could undesirably block the user's visual field and hence hamper the user's operation. Moreover, in the case of a display apparatus worn on the user's head, since a displayed image lowers the visibility of an outside scene in some cases, it is difficult in some cases for the user to operate an operation section of the display apparatus.

SUMMARY

An advantage of some aspects of the invention is to allow a user to readily select a content to be displayed and change the display state of the content through simple operation.

An aspect of the invention is directed to a display apparatus including a display section that is worn on a user's head, a detection section that detects at least one of a position and a motion of a detection target section including the head, a reference setting section that sets a reference state based on at least one of the position and motion of the detection target section detected by the detection section, and a display controlling section that changes display states of contents displayed by the display section based on changes in the position and motion of the detection target section with respect to the position and motion of the detection target section in the reference state, and the display controlling section changes the display states of the contents displayed by the display section in such a way that relative display positions of a plurality of the contents are maintained.

According to the configuration described above, the reference state can be set on the basis of at least one of the position and motion of the detection target section, and the display states of the plurality of contents can be changed on the basis of changes in the position and motion of the detection target section with respect to those in the set reference state. Further, when the display states of the contents are changed, they can be so changed that the relative display positions of the plurality of contents are maintained. Therefore, a content to be displayed can be readily selected, and the display state of the content can be changed through simple operation.

In the aspect of the invention, the display apparatus may further include a storage section that stores display position information representing the relative display positions of a plurality of the contents, and the display controlling section may change the display states of the contents in such a way that the relative display positions of a plurality of the contents represented by the display position information are maintained.

According to the aspect of the invention with this configuration, the display states of the contents displayed by the display section can be so changed that the relative display positions of the plurality of contents are maintained.

In the aspect of the invention, the display controlling section may select one of the contents based on changes in the position and motion of the detection target section with respect to the position and motion of the detection target section in the reference state and cause the display section to display the selected content.

According to the aspect of the invention with this configuration, a content can be selected on the basis of the amounts of changes in the position and motion of the detection target section, and the selected content can be displayed. A content can therefore be selected by the position or motion of the head, whereby a content can be readily selected.

In the aspect of the invention, the reference setting section may set, as the reference state, an axis of rotation of the detection target section and the position of the detection target section that rotates around the axis of rotation, and the display controlling section may be capable of setting the display positions of the contents along a rotational direction around the axis of rotation and along a direction perpendicular to the rotational direction.

According to the aspect of the invention with this configuration, the plurality of contents can be so set that the relative display positions of the plurality of contents are maintained.

In the aspect of the invention, the display controlling section may be capable of setting the display position of any of the contents on a rear side of the detection target section in the reference state.

According to the aspect of the invention with this configuration, the display positions of the contents can be changed in a variety of manners.

In the aspect of the invention, the display controlling section may be capable of setting the display positions of the contents in positions where the user is allowed to visually recognize a plurality of the contents arranged on a spherical surface around a point on the axis of rotation or in a plane separate from the axis of rotation by a predetermined distance.

According to the aspect of the invention with this configuration, the plurality of contents are set in positions where the user can visually recognize the contents arranged on a spherical surface around a point on the axis of rotation or in a plane separate from the axis of rotation by a predetermined distance. The display states of the plurality of contents can therefore be so changed that the relative display positions of the contents are maintained.

In the aspect of the invention, the display controlling section may be capable of setting the display position of any of the contents in a position where the user is allowed to visually recognize the content disposed in a plane containing the user's feet.

According to the aspect of the invention with this configuration, the user can visually recognize the content disposed in the plane containing the user's feet.

In the aspect of the invention, the display section may include a right display section that allows the user's right eye to visually recognize an image and a left display section that allows the user's left eye to visually recognize an image, and the display controlling section may cause any of the contents to be displayed with parallax present between the right display section and the left display section.

According to the aspect of the invention with this configuration, any of the contents can be displayed with parallax present between the right display section and the left display section. The content can therefore be displayed in a three-dimensional manner.

In the aspect of the invention, the reference setting section may set the reference state in accordance with a position or a motion of a pointing element.

According to the aspect of the invention with this configuration, the reference state can be set in accordance with the position or motion of the pointing element. The reference state can therefore be readily set.

In the aspect of the invention, the display controlling section may set a display magnification of any of the contents in the display section in accordance with the position or motion of the pointing element.

According to the aspect of the invention with this configuration, the display magnification of any of the contents can be set in accordance with the position or motion of the pointing element. The display magnification of the content can therefore be set through simple operation.

In the aspect of the invention, the display controlling section may cause the display section to display a content for input used for input operation performed on any of the contents.

According to the aspect of the invention with this configuration, the display section displays the content for input. Input operation can therefore be performed on the content via the content for input.

In the aspect of the invention, the reference setting section may set, when the reference setting section determines that the detection target section has been stationary for at least a predetermined period, the position of the stationary detection target section as the reference state.

According to the aspect of the invention with this configuration, when it is determined that the detection target section has been stationary for at least a predetermined period, the position of the stationary detection target section is set as the reference state. The reference state will therefore not be set in a position where the user does not intend.

In the aspect of the invention, the display apparatus may further include a sightline detection section that detects orientations of the user's sightlines, and the reference setting section may set the reference state including the position or motion of the detection target section and the orientations of the sightlines detected by the sightline detection section.

According to the aspect of the invention with this configuration, the reference state can be set on the basis of the position or motion of the detection target section and the orientations of the sightlines detected by the sightline detection section. The reference state can therefore be set in more detail in correspondence with the user's state.

In the aspect of the invention, the detection section may be disposed in an enclosure of the display section and include at least any of a GPS detection section that performs position detection based on GPS signals, an acceleration sensor that detects acceleration, an angular acceleration sensor that detects angular acceleration, a monocular camera, a stereocamera, and a magnetic sensor.

According to the aspect of the invention with this configuration, the detection section can detect the position or motion of the detection target section with precision.

In the aspect of the invention, the magnetic sensor may be disposed on a side facing an outer surface of the enclosure of the display section.

According to the aspect of the invention with this configuration, the influence of the enclosure on the magnetism detection performed by the magnetic sensor can be reduced.

In the aspect of the invention, the display apparatus may further include a processing section that performs a plurality of functions, and each of the contents corresponds to the functions performed by the processing section.

According to the aspect of the invention with this configuration, a content corresponding to the functions performed by the processing section can be displayed by the display section.

In the aspect of the invention, the display apparatus may further include an editing processing section that changes a substance of any of the contents displayed by the display section.

According to the aspect of the invention with this configuration, the editing processing section can change the substance of any of the contents.

In the aspect of the invention, the display controlling section may cause a plurality of the contents displayed by the display section to be displayed in a form of thumbnail images based on the amounts of changes in the position and motion of the detection target section with respect to the amounts of changes in the position and motion of the detection target section in the reference state.

According to the aspect of the invention with this configuration, the plurality of contents displayed by the display section can be displayed in the form of thumbnail images. The user can therefore readily grasp the contents displayed by the display section.

In the aspect of the invention, the display controlling section may predict changes in the position and motion of the detection target section with respect to the position and motion of the detection target section in the reference state and change the display state of any of the contents in accordance with a result of the prediction.

According to the aspect of the invention with this configuration, the display state of any of the contents can be changed in accordance with a result of the prediction of changes in the position and motion of the detection target section. The contents displayed by the display section can therefore be displayed in a plurality of positions. The display state of any of the contents can therefore be changed at an early timing.

In the aspect of the invention, the display controlling section may cause the display section to display a plurality of the contents in such a way that the plurality of contents are arranged in different positions in a direction extending from a near side toward a far side with respect to the detection target section.

According to the aspect of the invention with this configuration, the plurality of contents are arranged in different positions in the direction extending from the near side toward the far side with respect to the detection target section. The contents displayed by the display section can therefore be displayed in a plurality of positions.

Another aspect of the invention is directed to a method for controlling a display apparatus including a display section that is worn on a user's head, the method including a detecting step of detecting at least one of a position and a motion of a detection target section including the head, a setting step of setting a reference state based on at least one of the position and motion of the detection target section detected in the detecting step, and a changing step of changing display states of contents displayed by the display section based on changes in the position and motion of the detection target section with respect to the position and motion of the detection target section in the reference state, and the display states of the contents displayed by the display section are so changed that relative display positions of a plurality of the contents are maintained.

According to the configuration described above, the reference state can be set on the basis of at least one of the position and motion of the detection target section, and the display states of the contents can be changed on the basis of changes in the position and motion of the detection target section with respect to those in the set reference state. Further, when the display states of the contents are changed, they can be so changed that the relative display positions of the contents are maintained. Therefore, a content to be displayed can be readily selected, and the display state of the content can be changed through simple operation.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
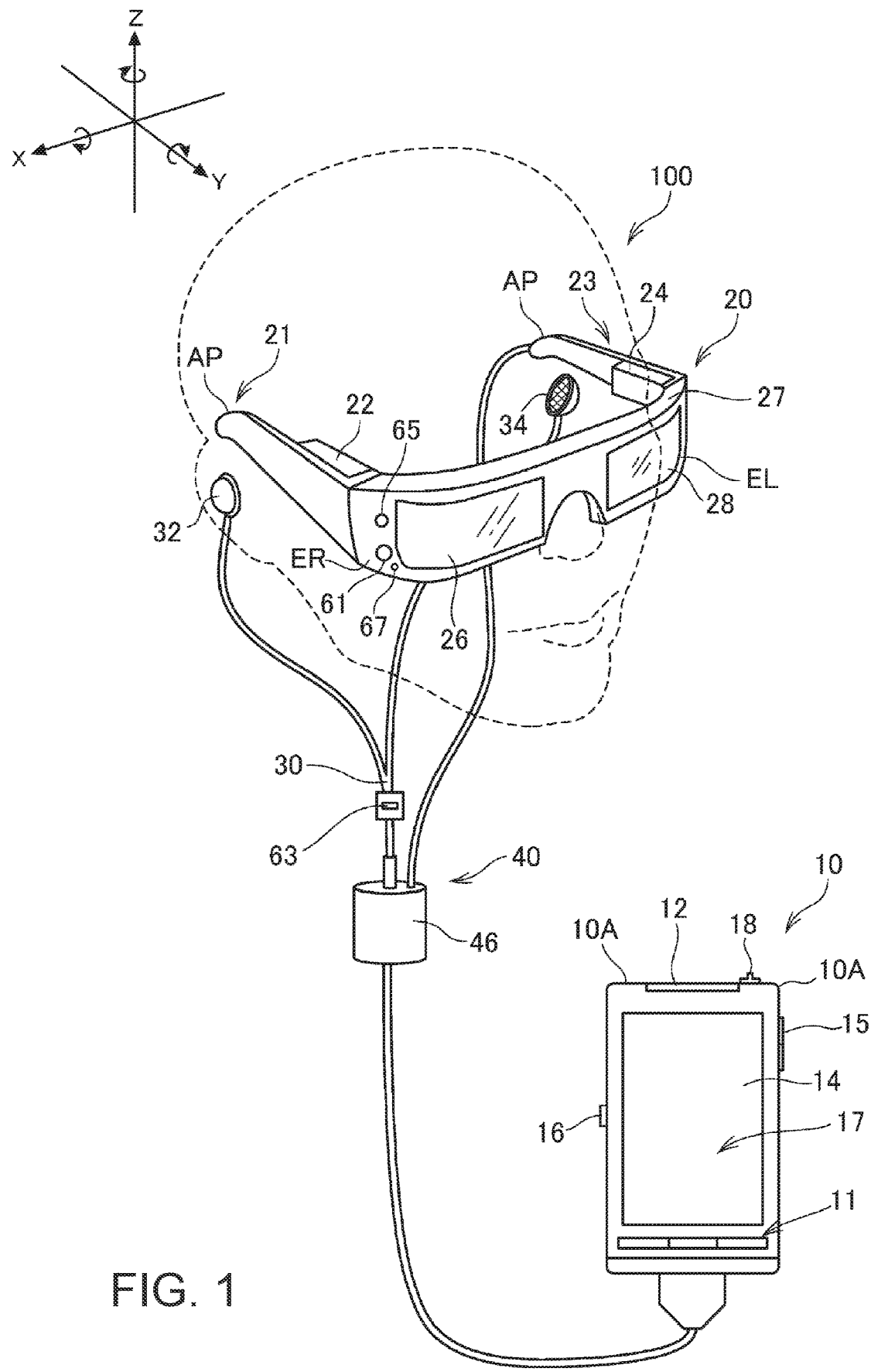
FIG. 1 is an exterior view of an HMD.

FIG. 1 is an exterior view showing an exterior configuration of an HMD (head mounted display) 100, which is configured by using a display apparatus and a method for controlling the display apparatus according to an embodiment of the invention.

The HMD 100 is a display apparatus including an image display section 20 (display section), which is worn on a user's head and allows the user to visually recognize a virtual image, and a control apparatus 10, which controls the image display section 20. A person who wears the image display section 20 on the head is called a user.

The control apparatus 10 includes a flat, box-shaped case 10A (can also be called enclosure or main body), as shown in FIG. 1. The case 10A includes buttons 11, an LED indicator 12, a trackpad 14, up/down keys 15, a changeover switch 16, and a power switch 18. The buttons 11, the trackpad 14, the up/down keys 15, the changeover switch 16, and the power switch 18 are operation sections operated by the user. The LED indicator 12 functions as a secondary display section showing, for example, the action state of the HMD 100. The user can operate the HMD 100 by operating the operation sections. The control apparatus 10 functions as a controller of the HMD 100.

The image display section 20 is a wearable part worn on the user's head and has a glasses-like shape in the present embodiment. The image display section 20 includes a main body formed of a right holder 21, a left holder 23, and a front frame 27, and the main body includes a right display unit 22, a left display unit 24, a right light guide plate 26, and a left light guide plate 28.

The right holder 21 and the left holder 23, which extend rearward from the opposite ends of the front frame 27, hold the image display section 20 on the user's head, as the temples (bows) of spectacles do. One of the opposite ends of the front frame 27 or the end located on the right of the user who wears the image display apparatus 20 is called an end ER, and the other end or the end located on the left of the user is called an end EL. The right holder 21 is so provided as to extend from the end ER of the front frame 27 to a position corresponding to a right temporal region of the user who wears the image display section 20. The left holder 23 is so provided as to extend from the end EL of the front frame 27 to a position corresponding to a left temporal region of the user who wears the image display section 20.

The right light guide plate 26 and the left light guide plate 28 are provided as part of the front frame 27. The right light guide plate 26 is located in front of the right eye of the user who wears the image display section 20 and allows the right eye to visually recognize an image. The left light guide plate 28 is located in front of the left eye of the user who wears the image display section 20 and allows the left eye to visually recognize an image.

The front frame 27 has a shape that links one end of the right light guide plate 26 and one end of the left light guide plate 28 to each other, and the linkage position corresponds to a position between the eyes of the user who wears the image display section 20. A nose pad that comes into contact with the nose of the user who wears the image display section 20 may be provided as part of the front frame 27 and in the position where the right light guide plate 26 and the left light guide plate 28 are linked to each other. In this case, the nose pad, the right holder 21, and the left holder 23 allow the image display section 20 to be held on the user's head. Further, a belt (not shown) that comes into contact with the back of the head of the user who wears the image display section 20 may be linked to the right holder 21 and the left holder 23, and in this case, the belt allows the image display section 20 to be securely held on the user's head.

The right display unit 22 displays an image via the right light guide plate 26. The right display unit 22 is provided as part of the right holder 21 and located in the vicinity of the right temporal region of the user who wears the image display section 20. The left display unit 24 displays an image via the left light guide plate 28. The left display unit 24 is provided as part of the left holder 23 and located in the vicinity of the left temporal region of the user who wears the image display section 20.

The right light guide plate 26 and the left light guide plate 28 in the present embodiment are each an optical section, a prism, for example, made, for example, of a light transmissive resin and guide image light outputted from the right display unit 22 and the left display unit 24 to the user's eyes.

A light control plate (not shown) may be provided on a surface of each of the right light guide plate 26 and the left light guide plate 28. The light control plate is a thin-plate-shaped optical element having transmittance that varies in accordance with the range of the wavelength of light passing therethrough and therefore functions as what is called a wavelength filter. The light control plates are so disposed as to cover, for example, part of the front side of the front frame 27, which is the side opposite the side facing the user's eyes. Appropriate selection of optical characteristics of the light control plates allows adjustment of the transmittance of light in an arbitrary wavelength range, such as visible light, infrared light, and ultraviolet light and therefore allows adjustment of the amount of outside light externally incident on the right light guide plate 26 and the left light guide plate 28 and passing through the right light guide plate 26 and the left light guide plate 28.

The image display section 20 guides the image light produced by the right display unit 22 and the left display unit 24 to the right light guide plate 26 and the left light guide plate 28. The image light guided to the right light guide plate 26 and the left light guide plate 28 is incident on the right eye and left eye of the user and allows the user to visually recognize virtual images. The image display section 20 thus displays an image.

In a case where outside light passes through the right light guide plate 26 and the left light guide plate 28 from the side in front of the user and impinges on the user's eyes, the image light that forms virtual images and the outside light are incident on the user's eyes, and the visibility of the virtual images is therefore affected by the intensity of the outside light. Therefore, for example, attaching the light control plates to the front frame 27 and selecting or adjusting the optical characteristics of the light control plates as appropriate allow adjustment of the visibility of the virtual images. In a typical example, light control plates having light transmittance high enough to at least allow the user who wears the HMD 100 to visually recognize an outside scene can be used. Further, when the light control plates are used, it can be expected to achieve an effect of protecting the right light guide plate 26 and the left light guide plate 28 and suppressing damage of the right light guide plate 26 and the left light guide plate 28, adhesion of dirt thereto, and other undesirable effects thereon. The light control plates may be attachable to and detachable from the front frame 27 or the right light guide plate 26 and the left light guide plate 28. A plurality of types of light control plates may be changed from one to another in an attachable/detachable manner, or the light control plates may be omitted.

A camera 61 is disposed in the front frame 27 of the image display section 20. The configuration and arrangement of the camera 61 are so determined that the camera 61 performs imaging in the direction toward an outside scene visually recognized by the user who wears the image display section 20. For example, the camera 61 is provided in the front surface of the front frame 27 and in a position where the camera 61 does not block the outside light passing through the right light guide plate 26 and the left light guide plate 28. In the example shown in FIG. 1, the camera 61 is disposed on the side facing the end ER of the front frame 27. The camera 61 may instead be disposed on the side facing the end EL of the front frame 27 or in the portion where the right light guide plate 26 and the left light guide plate 28 are linked to each other.

The camera 61 is a digital camera including an imaging element, such as a CCD or a CMOS element, an imaging lens, and other components. The camera 61 in the present embodiment is a monocular camera but may instead be a stereocamera. The camera 61 captures an image of at least part of an outside scene (real space) in the direction extending from the front side of the HMD 100, in other words, in the direction toward the visual field of the user who wears the HMD 100. In another expression, the camera 61 performs imaging over the range or in the direction that overlaps with the user's visual field and performs imaging in the direction in which the user gazes. The direction and size of the angle of view of the camera 61 can be set as appropriate. In the present embodiment, the angle of view of the camera 61 contains the outside visually recognized by the user through the right light guide plate 26 and the left light guide plate 28, as will be described later. More preferably, the angle of view of the camera 61 is so set that the camera 61 can capture an image of the user's entire visual field that the user can visually recognize through the right light guide plate 26 and the left light guide plate 28.

Figure 5:
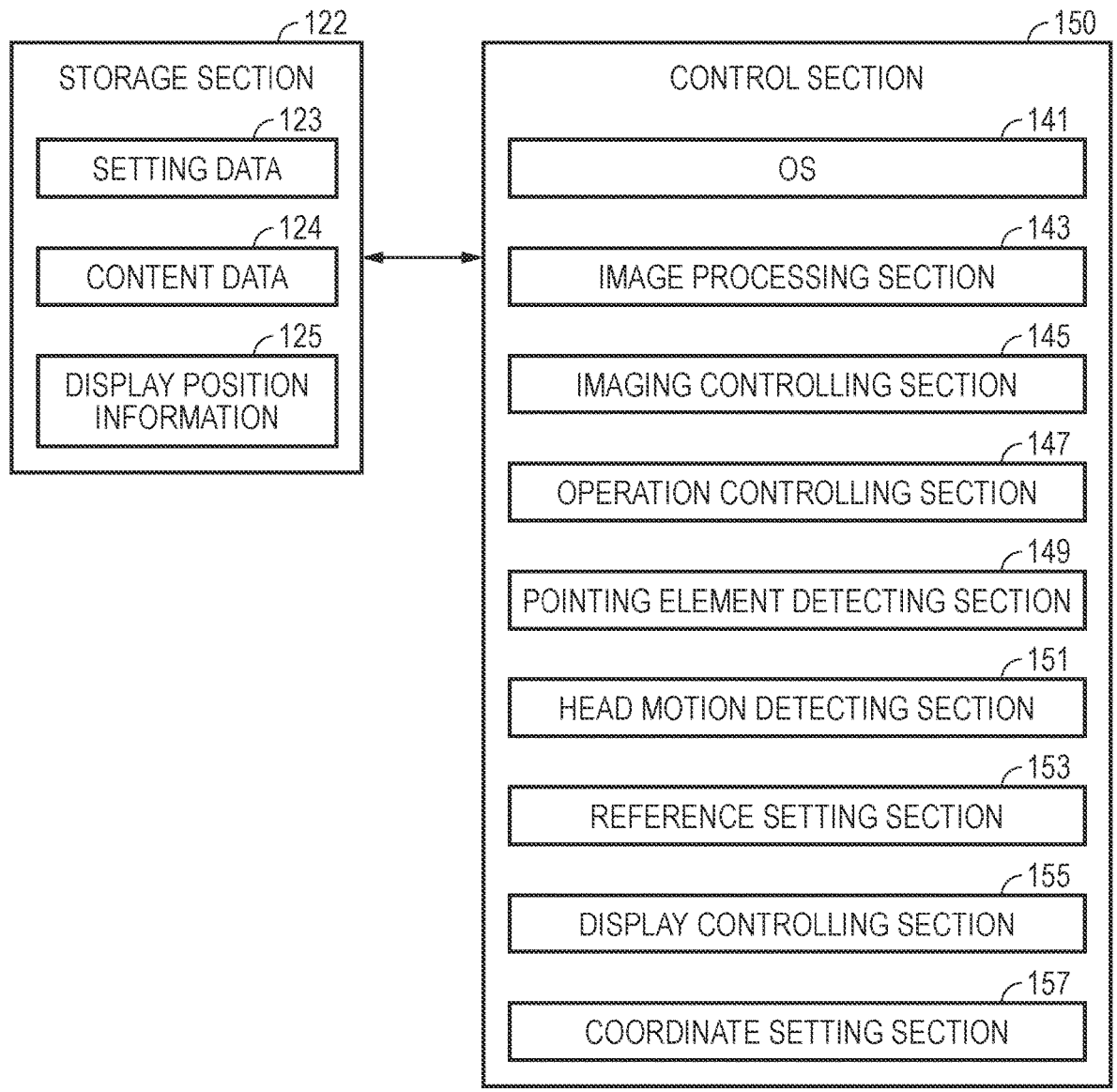
FIG. 5 is a functional block diagram of a control apparatus.

The camera 61 performs imaging under the control of an imaging control section 145, which is provided in a control section 150 (FIG. 5). The camera 61 outputs captured image data to the control section 150 via an interface 211, which will be described later.

Sightline sensors (sightline detection sections) 68 are disposed on the user's side of the image display section 20. The sightline sensors 68 are a pair of sensors provided in positions at the middle between the right light guide plate 26 and the left light guide plate 28 in correspondence with the user's right eye RE and left eye LE. The sightline sensors 68 are formed, for example, of a pair of cameras that capture images of the user's right eye RE and left eye LE. The sightline sensors 68 perform imaging under the control of the control section 150 (FIG. 5), and the control section 150 detects, from the captured image data, light reflected off the eyeball surfaces of the right eye RE and the left eye LE and images of the pupils to identify the sightline directions.

Figure 2:
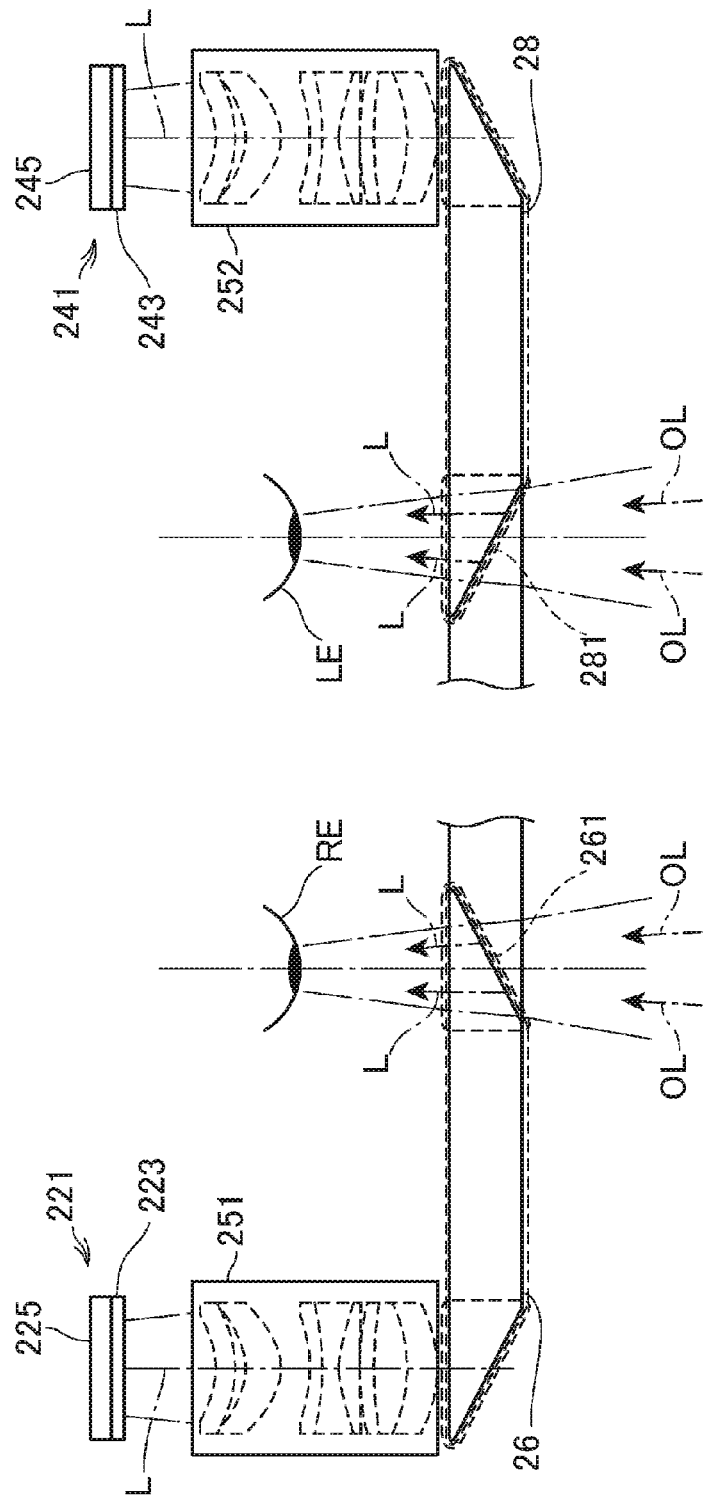
FIG. 2 is a key part plan view showing the configuration of an optical system of the HMD.

FIG. 2 is a key part plan view showing the configuration of an optical system provided in the image display section 20. FIG. 2 shows the user's right eye RE and left eye LE for ease of description.

The right display unit 22 and the left display unit 24 have a bilaterally symmetric structure, as shown in FIG. 2. As a configuration that allows the user's right eye RE to visually recognize an image, the right display unit 22 includes an OLED (organic light emitting diode) unit 221, which emits image light, and a right optical system 251, which includes lens groups and other components that guide the image light L emitted from the OLED unit 221. The image light L is guided by the right optical system 251 to the right light guide plate 26.

The OLED unit 221 includes an OLED panel 223 and an OLED drive circuit 225, which drives the OLED panel 223. The OLED panel 223 is a self-luminous display panel formed of light emitting elements that are arranged in a matrix and emit R (red) G (green), and B (blue) color light fluxes on the basis of organic electroluminescence. The OLED panel 223 has a plurality of pixels with each of the pixels being a light emitting unit formed of one R element, one G element, and one B element, and the pixels arranged in a matrix form an image. The OLED drive circuit 225 selects a light emitting element provided in the OLED panel 223 and supplies the light emitting element with electric power to cause the light emitting element in the OLED panel 223 to emit light under the control of the control section 150 (FIG. 5). The OLED drive circuit 225 is fixed to the rear surface of the OLED panel 223, that is, the rear side of the light emitting surface, for example, in a bonding process. The OLED drive circuit 225 may be formed, for example, of a semiconductor device that drives the OLED panel 223 and mounted on a substrate (not shown) fixed to the rear surface of the OLED panel 223. A temperature sensor 217 is mounted on the substrate.

The OLED panel 223 may instead have a configuration in which light emitting elements that emit white light are arranged in a matrix and color filters corresponding to the R, G, and B three colors are so disposed as to be superimposed on the light emitting elements. Still instead, an OLED panel 223 having a WRGB configuration including light emitting elements that radiate W (white) light in addition to the light emitting elements that radiate the R, G, and B color light fluxes may be used.

The right optical system 251 includes a collimator lens that converts the image light L outputted from the OLED panel 223 into a parallelized light flux. The image light L having been converted by the collimator lens into a parallelized light flux is incident on the right light guide plate 26. A plurality of reflection surfaces that reflect the image light L are formed along the optical path along which the light is guided in the right light guide plate 26. The image light L undergoes reflection multiple times in the right light guide plate 26 and is guided toward the right eye RE. A half-silvered mirror 261 (reflection surface) located in front of the right eye RE is formed on the right light guide plate 26. The image light L is reflected off the half-silvered mirror 261, exits out of the right light guide plate 26 toward the right eye RE, and forms an image on the retina of the right eye RE, whereby an image is visually recognized by the user.

As a configuration that allows the user's left eye LE to visually recognize an image, the left display unit 24 includes an OLED unit 241, which emits image light, and a left optical system 252, which includes lens groups and other components that guide the image light L emitted from the OLED unit 241. The image light L is guided by the left optical system 252 to the left light guide plate 28.

The OLED unit 241 includes an OLED panel 243 and an OLED drive circuit 245, which drives the OLED panel 243. The OLED panel 243 is a self-luminous display panel configured in the same manner as the OLED panel 223. The OLED drive circuit 245 selects a light emitting element provided in the OLED panel 243 and supplies the light emitting element with electric power to cause the light emitting element in the OLED panel 243 to emit light under the control of the control section 150 (FIG. 5). The OLED drive circuit 245 is fixed to the rear surface of the OLED panel 243, that is, the rear side of the light emitting surface, for example, in a bonding process. The OLED drive circuit 245 may be formed, for example, of a semiconductor device that drives the OLED panel 243 and mounted on a substrate (not shown) fixed to the rear surface of the OLED panel 243. A temperature sensor 239 is mounted on the substrate.

The right optical system 252 includes a collimator lens that converts the image light L outputted from the OLED panel 243 into a parallelized light flux. The image light L having been converted by the collimator lens into a parallelized light flux is incident on the left light guide plate 28. The left light guide plate 28 is an optical element in which a plurality of reflection surfaces that reflect the image light L are formed and is, for example, a prism. The image light L undergoes reflection multiple times in the left light guide plate 28 and is guided toward the left eye LE. A half-silvered mirror 281 (reflection surface) located in front of the left eye LE is formed on the left light guide plate 28. The image light L is reflected off the half-silvered mirror 281, exits out of the left light guide plate 28 toward the left eye LE, and forms an image on the retina of the left eye LE, whereby an image is visually recognized by the user.

The HMD 100 having the configuration described above functions as a see-through-type display apparatus. That is, on the user's right eye RE are incident the image light L having been reflected off the half-silvered mirror 261 and outside light OL having passed through the right light guide plate 26. On the user's left eye LE are incident the image light L having been reflected off the half-silvered mirror 281 and outside light OL having passed through the half-silvered mirror 281. The HMD 100 thus causes the image light L carrying internally processed images and the outside light OL to be superimposed on each other and causes the superimposed light to be incident on the user's eyes, and the user views an outside scene through the right light guide plate 26 and the left light guide plate 28 and visually recognizes images formed by the image light L and superimposed on the outside scene.

The half-silvered mirrors 261 and 281 are image extracting sections that reflect the image light outputted from the right display unit 22 and the left display unit 24 and extract images from the image light, and it can be said that the half-silvered mirrors 261 and 281 form the display section.

The left optical system 252 and the left light guide plate 28 are also collectively called a "left light guide unit," and the right optical system 251 and the right light guide plate 26 are also collectively called a "right light guide unit." The configuration of the right and left light guide units is not limited to the example described above and can be arbitrarily configured as long as the image light is used to form virtual images in front of the user's eyes. A diffraction grating or a half-transmissive/reflective film may, for example, be used as each of the right and left light guide units.

Referring back to FIG. 1, the control apparatus 10 and the image display section 20 are connected to each other via a connection cable 40. The connection cable 40, which is detachably connected to a connector (not shown) provided on the lower side of the case 10A, is inserted through the end of the left holder 23 and connected to a variety of circuits provided in the image display section 20. The connection cable 40 includes a metal cable or an optical fiber cable through which digital data is transmitted and may further include a metal cable through which an analog signal is transmitted. A connector 46 is provided in a halfway position along the connection cable 40. The connector 46 is a jack to which a stereo mini plug is connected, and the connector 46 and the control apparatus 10 are connected to, for example, via a line through which an analog voice signal is transmitted. In the configuration example shown in FIG. 1, a headset 30 including a right earphone 32 and a left earphone 34, which form a stereo headphone, and a microphone 63 is connected to the connector 46.

The control apparatus 10 and the image display section 20 may be wirelessly connected to each other. For example, the control apparatus 10 and the image display section 20 may be configured to transmit and receive control signals and data to and from each other over wireless communication compliant, for example, with Bluetooth (registered trademark), a wireless LAN (including WiFi (registered trademark)), or any other standard.

Figure 4:
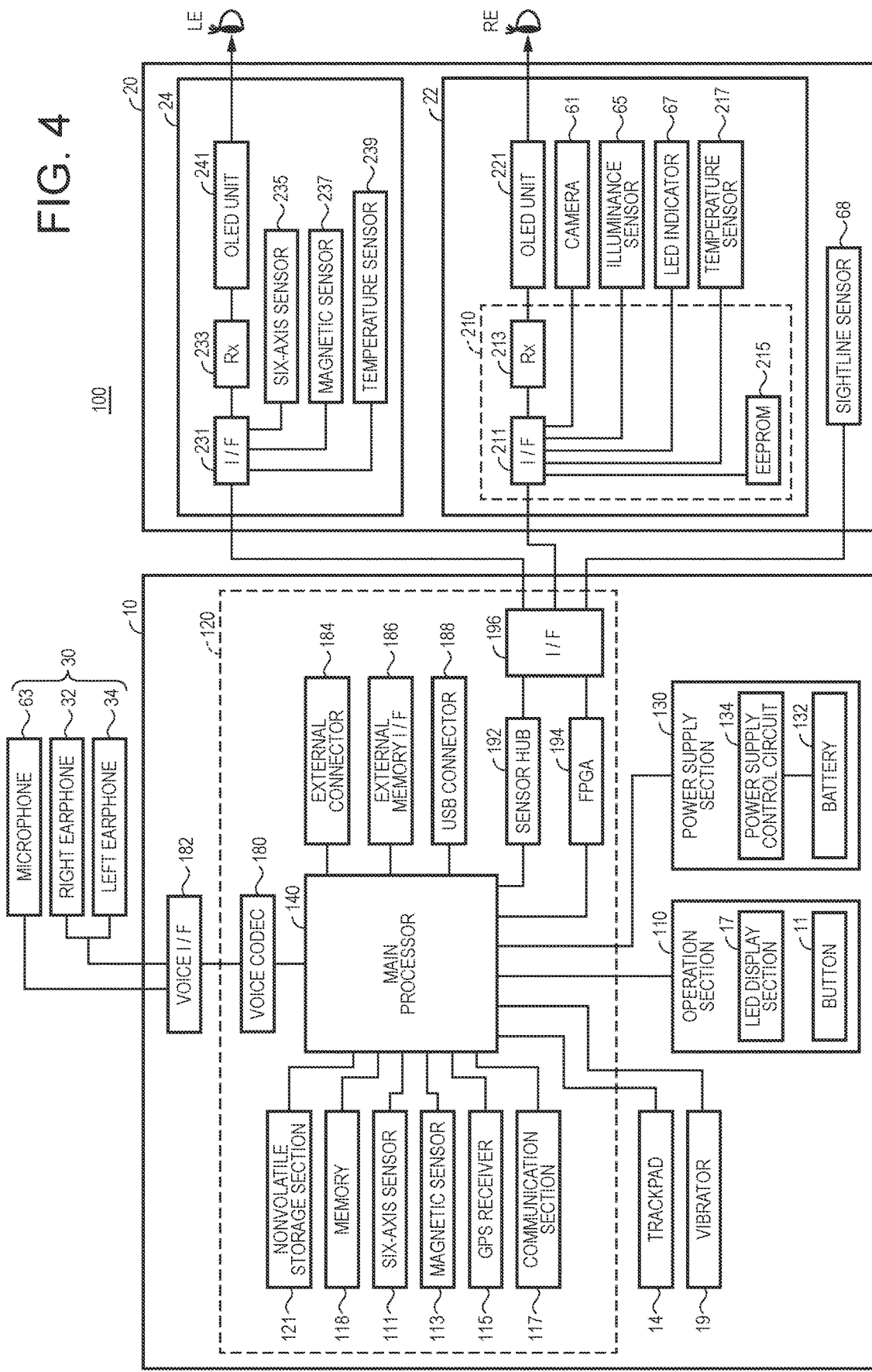
FIG. 4 is a block diagram of the HMD.

The microphone 63 is so disposed that a sound collector of the microphone 63 faces along the user's sightlines as shown, for example, in FIG. 1 and collects voice and outputs a voice signal to a voice interface 182 (FIG. 4). The microphone 63 may, for example, be a monaural microphone, a stereo microphone, a directional microphone, or an omni-directional microphone.

The control apparatus 10 includes, as the operation sections operated by the user, the buttons 11, the LED indicator 12, the trackpad 14, the up/down keys 15, the changeover switch 16, and the power switch 18. The operation sections are disposed on the surface of the case 10A.

The buttons 11 are formed of keys and switches for operating the control apparatus 10, and the keys and switches are displaced when they are pressed. For example, the buttons 11 are formed of a menu key, a home key, and a "return" key for operation relating to an operation system 141 (FIG. 5) and other types of software executed by the control apparatus 10.

The LED indicator 12 illuminates or blinks in correspondence with the action state of the HMD 100. The up/down keys 15 are used to input an instruction of increase and decrease of the magnitude of sound outputted from the right earphone 32 and the left earphone 34 and input an instruction of increase and decrease of the brightness of an image displayed by the image display section 20. The changeover switch 16 is a switch that switches an input corresponding to operation of one of the up/down keys 15 to an input corresponding to operation of the other one of the up/down keys 15 and vice versa. The power switch 18 is a switch that switches the power-on state and the power-off state of the HMD 100 from one to the other and is, for example, of a slide switch.

The trackpad 14 has an operation surface that detects contact operation and outputs an operation signal in accordance with operation performed on the operation surface. A method for detecting operation performed on the operation surface is not limited to a specific method and can be an electrostatic method, a pressure detection method, an optical method, or any other method. Contact operation performed on the trackpad 14 (touch operation) is detected with a touch sensor (not shown). The trackpad 14 is provided with an LED display section 17. The LED display section 17 includes a plurality of LEDs, and light from each of the LEDs passes through the trackpad 14 and displays icons or other symbols for operation. The icons or other symbols each function as a software button.

Figure 3:
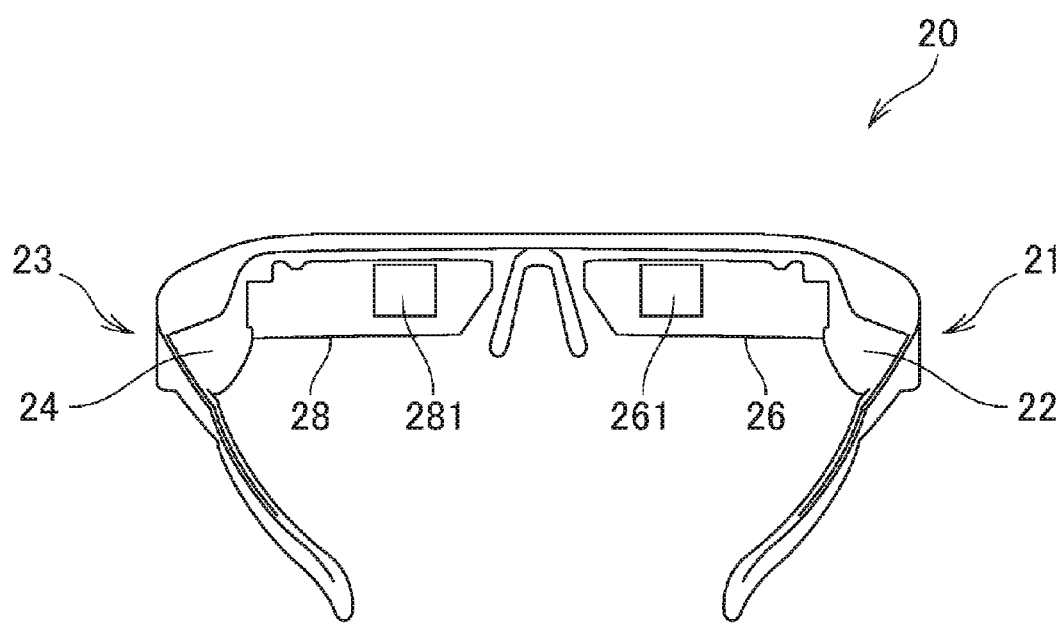
FIG. 3 is a perspective view showing the configuration of an image display section.

FIG. 3 is a perspective view showing the configuration of the image display section 20 and shows a key part configuration when the image display section 20 is viewed from the side facing the user's head. FIG. 3 shows one side of the image display section 20, that is, the side facing the user's head, in other words, the side visible to the user's right eye RE and left eye LE. In another expression, FIG. 3 shows the rear side of the right light guide plate 26 and the left light guide plate 28.

In FIG. 3, the half-silvered mirror 261, via which the user's right eye RE is irradiated with image light, and the half-silvered mirror 281, via which the user's left eye LE is irradiated with image light, are each viewed as a roughly quadrangular region. The entire right light guide plate 26 and left light guide plate 28 including the half-silvered mirrors 261 and 281 transmit outside light, as described above. The user therefore visually recognizes an outside scene through the entire right light guide plate 26 and left light guide plate 28 and further visually recognizes rectangular displayed images in the positions of the half-silvered mirrors 261 and 281.

The camera 61 is disposed in a right end portion of the image display section 20 and performs imaging in the direction in which the user's two eyes are oriented, that is, captures an image of a space in front of the user. The optical axis of the camera 61 falls within the range containing the directions of the sightlines extending from the right eye RE and the left eye LE. The outside scene visually recognizable by the user who wears the HMD 100 is not limited to the infinity. For example, when the user gazes at a target object located in front of the user with the two eyes, the distance from the user to the target object ranges from about 30 cm to 10 m in many cases, and the distance is more likely to range from about 1 to 4 m. In view of the fact described above, guideline values of the upper and lower limits of the distance from the user to the target object in typical conditions under which the HMD 100 is used may be set. The guideline values may be determined by investigation or experiment or may be set by the user. The optical axis and the angle of view of the camera 61 are preferably so set that the target object falls within the angle of view in a case where the distance to the target object under the typical use condition is equal to the set guideline value of the upper limit and in a case where the distance is equal to the set guideline value of the lower limit.

In general, it is believed that a person's angular field of view is about 200 degrees in the horizontal direction and about 125 degrees in the vertical direction. Within these ranges, an effective field of view, where the person has excellent information reception capability, extends over a horizontal range of about 30 degrees and a vertical range of about 20 degrees. It is further believed that a stable field of fixation, where a point of fixation at which the person gazes is viewed in a quick, stable manner, extends over a horizontal range from about 60 to 90 degrees and a vertical range from about 45 to 70 degrees. In a case where the point of fixation coincides with the target object located in front of the user, the effective field of view within the user's field of view extends over the horizontal range of about 30 degrees and the vertical range of about 20 degrees around the sightlines extending from the right eye RE and the left eye LE. The stable field of fixation extends over the horizontal range from about 60 to 90 degrees and the vertical range from about 45 to 70 degrees around the sightlines, and the angular field of view extends over the horizontal range from about 200 degrees and the vertical range from about 125 degrees around the sightlines. The actual field of view visually recognized by the user through the right light guide plate 26 and the left light guide plate 28 can be called an actual field of view (FOV). The actual field of view corresponds to the field of view actually visually recognized by the user through the right light guide plate 26 and the left light guide plate 28 in the configuration of the present embodiment shown in FIGS. 1 and 2. The actual field of view is narrower than the angular field of view and the stable field of fixation but wider than the effective field of view.

The angle of view of the camera 61 preferably allows imaging over a range wider than the user's field of view. Specifically, the angle of view is preferably wider than at least the user's effective field of view. The angle of view is more preferably wider than the user's actual field of view. The angle of view is further preferably wider than the user's stable field of fixation and is most preferably wider than the user's binocular angular field of view.

The camera 61 may include what is called a wide-angle lens as the imaging lens for imaging over a wide angle of view. The wide-angle lens may include a lens called a super-wide-angle lens or a semi-wide-angle lens. The camera 61 may include a fixed-focal-length lens, a zoom lens, or a lens group formed of a plurality of lenses.

FIG. 4 is a block diagram showing the configuration of each portion that forms the HMD 100.

The control apparatus 10 includes a main processor 140, which executes a program to control the HMD 100. A memory 118 and a nonvolatile storage section 121 are connected to the main processor 140. Further, the trackpad 14 and an operation section 110 are connected as input devices to the main processor 140. A six-axis sensor 111 and a magnetic sensor 113 are connected as sensors to the main processor 140. A GPS (global positioning system) receiver 115, a communication section 117, a voice codec 180, an external connector 184, an external memory interface 186, a USB connector 188, a sensor hub 192, and an FPGA 194 are connected to the main processor 140. The portions described above function as interfaces to an external apparatus.

The main processor 140 is mounted on a controller substrate 120 built in the control apparatus 10. The memory 118, the nonvolatile storage section 121, and other components may be mounted on the controller substrate 120 in addition to the main processor 140. In the present embodiment, the six-axis sensor 111, the magnetic sensor 113, the GPS receiver 115, the communication section 117, the memory 118, the nonvolatile storage section 121, the voice codec 190, and other components are mounted on the controller substrate 120. The external connector 184, the external memory interface 186, the USB connector 188, the sensor hub 192, the FPGA 194, and an interface 196 may further be mounted on the controller substrate 120.

The memory 118 forms a work area that is used when the main processor 140 executes a program, and the memory 118 temporarily stores the program executed by the main processor 140 and data processed by the main processor 140. The nonvolatile storage section 121 is formed of a flash memory or an eMMC (embedded multimedia card). The nonvolatile storage section 121 stores the program executed by the main processor 140 and a variety of data processed when the main processor 140 executes the program.

The main processor 140 detects contact operation performed on the operation surface of the trackpad 14 on the basis of the operation signal inputted from the trackpad 14 and acquires an operation position.

The operation section 110 includes the buttons 11 and the LED display section 17. When any of operation components, such as the buttons that form the buttons 11 and switches, is operated, the operation section 110 outputs an operation signal corresponding to the operated operation component to the main processor 140.

The LED display section 17 controls the LED indicator 12 to start and stop illuminating under the control of the main processor 140. The LED display section 17 may include LEDs (not shown) disposed immediately below the trackpad 14 and a drive circuit that turns on the LEDs. In this case, the LED display section 17 causes the LEDs to start illuminating, blink, and stop illuminating under the control of the main processor 140.

The six-axis sensor 111 is a motion sensor (inertia sensor) including a three-axis acceleration sensor and a three-axis gyro (angular velocity) sensor. The six-axis sensor 111 may be an IMU (inertial measurement unit) that incorporates the sensors described above in a modular form.

The magnetic sensor 113 is, for example, a three-axis geomagnetic sensor.

The six-axis sensor 111 and magnetic sensor 113 output detection values to the main processor 140 in accordance with sampling frequencies specified in advance. The six-axis sensor 111 and magnetic sensor 113 output the detection values to the main processor 140 in response to a request from the main processor 140 at the timing specified by the main processor 140.

The GPS receiver 115 includes a GPS antenna that is not shown and receives GPS signals transmitted from GPS satellites. The GPS receiver 115 outputs the received GPS signals to the main processor 140. The GPS receiver 115 further measures signal strengths of the received GPS signals and outputs the measured signal strengths to the main processor 140. The signal strengths can, for example, be expressed in the form of information on the received signal strength indication (RSSI), the electric field strength, or the magnetic field strength, the signal-to-noise ratio (SNR).

The communication section 117 performs wireless communication with an external apparatus. The communication section 117 includes an antenna, an RF circuit, a baseband circuit, a communication control circuit, and other components or is formed of a device in which the components described above are integrated with one another. The communication section 117 performs wireless communication compliant, for example, with Bluetooth, a wireless LAN standard (including Wi-Fi), or any other standard.

The voice interface 182 is an interface that inputs and outputs a voice signal. In the present embodiment, the voice interface 182 includes the connector 46 (FIG. 1), with which the connection cable 40 is provided. The connector 46 is connected to the headset 30. The voice signal outputted via the voice interface 182 is inputted to the right earphone 32 and the left earphone 34, and the right earphone 32 and the left earphone 34 then output voice. The microphone 63, with which the headset 30 is provided, collects voice and outputs a voice signal to the voice interface 182. The voice signal inputted from the microphone 63 to the voice interface 182 is inputted to the external connector 184.

The voice codec 180 is connected to the voice interface 182 and decodes/encodes a voice signal inputted and outputted via the voice interface 182. The voice codec 180 may include an A/D converter that converts an analog voice signal into digital voice data and a D/A converter that performs conversion in the opposite direction. For example, the HMD 100 in the present embodiment outputs voice via the right earphone 32 and the left earphone 34 and collects voice via the microphone 63. The voice codec 180 converts digital voice data outputted by the main processor 140 into an analog voice signal and outputs the signal via the voice interface 182. The voice codec 180 further converts an analog voice signal inputted to the voice interface 182 into digital voice data and outputs the data to the main processor 140.

The external connector 184 is a connector that connects the main processor 140 to an external apparatus that communicates with the main processor 140. The external connector 184 is an interface that connects the external apparatus to the main processor 140, for example, when the computer program executed by the main processor 140 is debugged or action logs of the HMD 100 are collected.

The external memory interface 186 is an interface that allows connection to a portable memory device and includes, for example, a memory card slot, into which a card-shaped recording medium is inserted and via which data can be read, and an interface circuit. The size, shape, and standard of the card-shaped recording medium in this case are not limited to specific ones and can be changed as appropriate.

The USB (universal serial bus) connector 188 includes a connector compliant with the USB standard and an interface circuit. The USB connector 188 allows connection to a USB memory device, a smartphone, a computer, and other devices. The size, shape, and compatible USB standard version of the USB connector 188 can be selected and changed as appropriate.

The sensor hub 192 and the FPGA 194 are connected to the image display section 20 via the interface (I/F) 196. The sensor hub 192 acquires detection values from the variety of sensors provided in the image display section 20 and outputs the detection values to the main processor 140. The FPGA 194 processes data transmitted from the main processor 140 and received by the portions of the image display section 20 and vice versa and transports the processed data via the interface 196.

The HMD 100 further includes a vibrator 19. The vibrator 19 includes a motor and an off-center rotator (neither of them is shown) and may include other necessary configurations. Rotary operation of the motor described above under the control of the main processor 140 allows the vibrator 19 to produce vibration. The HMD 100 causes the vibrator 19 to produce vibration in a predetermined vibration pattern when operation performed on the operation section 110 is detected, when the HMD 100 is powered on and off, or in other cases.

The right display unit 22 and the left display unit 24 of the image display section 20 are each connected to the control apparatus 10. In the HMD 100, the connection cable 40 is connected to the left holder 23, as shown in FIG. 1, and a wiring line connected to the connection cable 40 is routed in the image display section 20, whereby the right display unit 22 and the left display unit 24 are each connected to the control apparatus 10.

The right display unit 22 includes a display unit substrate 210. On the display unit substrate 210 are mounted an interface (I/F) 211, which is connected to the interface 196, a receiver (Rx) 213, which receives data inputted from the control apparatus 10 via the interface 211, and an EEPROM 215.

The interface 211 connects the receiver 213, the EEPROM 215, the temperature sensor 217, the camera 61, an illuminance sensor 65, and an LED indicator 67 to the control apparatus 10.

The EEPROM (electrically erasable read-only memory) 215 stores a variety of types of data in the form readable by the main processor 140. The EEPROM 215 stores, for example, data on light emission characteristics and display characteristics of the OLED units 221 and 241 provided in the image display section 20, data on the characteristics of the sensor provided in the right display unit 22 or the left display unit 24, and other data. Specifically, the EEPROM 215 stores a parameter involved in gamma correction of the OLED units 221 and 241, data used to compensate detection values from the temperature sensors 217 and 239, and other data. These data are produced when the HMD 100 is inspected just before the HMD 100 is shipped from the factory and written onto the EEPROM 215. After the shipment, the main processor 140 uses the data in the EEPROM 215 to carry out the processes described above.

The camera 61 performs imaging in accordance with a signal inputted via the interface 211 and outputs captured image data or a signal representing an imaging result to the control apparatus 10.

The illuminance sensor 65 is provided at the end ER of the front frame 27 and so disposed as to receive outside light from a space in front of the user who wears the image display section 20, as shown in FIG. 1. The illuminance sensor 65 outputs a detection value corresponding to the amount of light received by the illuminance sensor 65 (intensity of light received by illuminance sensor 65).

The LED indicator 67 is disposed at the end ER of the front frame 27 and in the vicinity of the camera 61, as shown in FIG. 1. The LED indicator 67 illuminates when the camera 61 is performing imaging to notify the user that the imaging is underway. The camera 61 may be a monocular camera or a stereocamera.

The temperature sensor 217 performs temperature detection and outputs, as a detection value, a voltage value or a resistance value corresponding to the detected temperature. The temperature sensor 217 is mounted on the rear side of the OLED panel 223 (FIG. 2). The temperature sensor 217 may instead be mounted, for example, on the substrate on which the OLED drive circuit 225 is mounted. In the configuration described above, the temperature sensor 217 primarily detects the temperature of the LED panel 223.

The receiver 213 receives data transmitted by the main processor 140 via the interface 211. The receiver 213, when it receives image data on an image to be displayed by the OLED unit 221, outputs the received image data to the OLED drive circuit 225 (FIG. 2).

The left display unit 24 includes a display unit substrate 210. On the display unit substrate 210 are mounted an interface (I/F) 231, which is connected to the interface 196, and a receiver (Rx) 233, which receives data inputted from the control apparatus 10 via the interface 231. A six-axis sensor 235 and a magnetic sensor 237 are mounted on the display unit substrate 210. The magnetic sensor 237 may instead be disposed on the side facing the outer surface of the enclosure of the image display section 20. In a case where the enclosure of the image display section 20 is made of metal, noise is superimposed on a detection value from the magnetic sensor 237 and the detection accuracy of the magnetic sensor 237 lowers in some cases. The magnetic sensor 237 can therefore be disposed on the side facing the outer surface of the enclosure of the image display section 20, whereby decrease in the detection accuracy of the magnetic sensor 237 can be avoided.

The interface 231 connects the receiver 233, the six-axis sensor 235, the magnetic sensor 237, and the temperature sensor 239 to the control apparatus 10.

The six-axis sensor 235 is a motion sensor (inertia sensor) including a three-axis acceleration sensor and a three-axis gyro (angular velocity) sensor. The six-axis sensor 235 may be an IMU that incorporates the sensors described above in a modular form.

The magnetic sensor 237 is, for example, a three-axis geomagnetic sensor.

The temperature sensor 239 performs temperature detection and outputs, as a detection value, a voltage value or a resistance value corresponding to the detected temperature. The temperature sensor 239 is mounted on the rear side of the OLED panel 243 (FIG. 2). The temperature sensor 239 may instead be mounted, for example, on the substrate on which the OLED drive circuit 245 is mounted. In the configuration described above, the temperature sensor 239 primarily detects the temperature of the OLED panel 243.

The temperature sensor 239 may instead be built in the OLED panel 243 or the OLED drive circuit 245. The substrate described above may be a semiconductor substrate. Specifically, in a case where the OLED panel 243 is implemented as an Si-OLED, along with the OLED drive circuit 245 and other components, in the form of an integrated circuit on a unified semiconductor chip, the temperature sensor 239 may be implemented in the semiconductor chip.

The camera 61, the illuminance sensor 65, and the temperature sensor 217 provided in the right display unit 22, and the six-axis sensor 235, the magnetic sensor 237, and the temperature sensor 239 provided in the left display unit 24 are connected to the sensor hub 192. The sensor hub 192 sets and initializes, under the control of the main processor 140, the sampling cycle in accordance with which each of the sensors performs detection. The sensor hub 192, for example, conducts electricity to each of the sensors, transmits control data thereto, and acquires a detection value therefrom in accordance with the sampling cycle in accordance with which the sensor performs detection. The sensor hub 192 outputs detection values from the sensors provided in the right display unit 22 and the left display unit 24 at preset timings to the main processor 140. The sensor hub 192 may have the function of temporarily holding the detection value from each of the sensors in accordance with the timing when the detection value is outputted to the main processor 140. The sensor hub 192 may have the function of converting data in different formats into data in a unified format in correspondence with differences in the signal format or data format of the detection values from the sensors and outputting the converted data to the main processor 140.

The sensor hub 192 starts or stops conducting electricity to the LED indicator 67 under the control of the main processor 140 to turn on the LED indicator 67 or cause the LED indicator 67 to blink in synchronization with the timing when the camera 61 starts or stops imaging.

The control apparatus 10 includes a power supply section 130 and operates by using electric power supplied from the power supply section 130. The power supply section 130 includes a chargeable battery 132 and a power supply control circuit 134, which detects the amount of remaining electric power in the battery 132 and controls electricity charge of the battery 132. The power supply control circuit 134 is connected to the main processor 140 and outputs a detection value representing the amount of remaining electric power in the battery 132 or a detection value representing the voltage across the battery 132 to the main processor 140. Electric power may be supplied from the control apparatus 10 to the image display section 20 on the basis of the electric power supplied from the power supply section 130. The main processor 140 may be configured to be capable of controlling the state of electric power supply from the power supply section 130 to not only the portions of the control apparatus 10 but the image display section 20.

FIG. 5 is a functional block diagram of a storage section 122 and the control section 150, which form the control system of the control apparatus 10. The storage section 122 shown in FIG. 5 is a logical storage section formed of the nonvolatile storage section 121 (FIG. 4) and may include the EEPROM 215. The control section 150 and a variety of functional portions provided in the control section 150 are achieved when the main processor 140 executes the program, that is, when the program and the hardware cooperate with each other. The control section 150 and the functional portions that form the control section 150 are formed, for example, of the main processor 140, the memory 118, and the nonvolatile storage section 121. The control section 150 corresponds to the "processing section" in an aspect of the invention.

The control section 150 uses data stored in the storage section 122 to carry out a variety of processes to control the HMD 100. The storage section 122 stores a variety of data to be processed by the control section 150. Specifically, the storage section 122 stores setting data 123, content data 124, and display position information 125.

The setting data 123 contains a variety of setting values used to set the action of the HMD 100. In a case where the control section 150 uses a parameter, a determinant, an arithmetic expression, an LUT (lookup table), and other factors when the control section 150 controls the HMD 100, the setting data 123 may contain the parameter and the like.

The content data 124 is data displayed by the image display section 20 under the control of the control section 150 and contains, for example, document files, such as those created by Word and Excel, still image data, and motion image data. The content data 124 may further contain voice data. The content data 124 may be 3D image data that contains parallax and allows the right display unit 22 and the left display unit 24 to display images with the parallax therebetween. The content data 124 may be image data for displaying images of operation buttons, a GUI (graphical user interface), a software keyboard, and other objects displayed by using AR (augmented reality).

The content data 124 may be a bidirectional content that causes the image display section 20 to display the content, causes the control apparatus 10 to accept the user's operation, and causes the control section 150 to carry out a process according to the acquired operation. In this case, the content data 124 may contain image data on a menu screen displayed to accept operation, data that specifies a process or any other action corresponding to each item contained in the menu screen, and other data.

The display position information 125 is information representing relative display positions of a plurality of contents. The display position information 125, which will be described later in detail, is formed of information for identifying an application program (hereinafter referred to as application) that displays a content and information representing the display size of the content displayed by the application and the coordinates to which the content is related in a spherical coordinate system. The spherical coordinate system will be described later in detail. The display position information 125 further contains information representing a reference orientation set as a reference state, which will be described later, and the angle of elevation or the angle of depression representing the inclination of the user's head.

The control section 150 includes, as functional blocks, an operating system (OS) 141, an image processing section 143, an imaging controlling section 145, an operation controlling section 147, a pointing element detecting section 149, a head motion detecting section 151, a reference setting section 153, a display controlling section 155, and a coordinate setting section 157. The functional blocks represent functions achieved when a CPU develops the program in a RAM and executes the developed program and expressed in the form of blocks for convenience. The control section 150 can also function, in addition to the functional blocks, as a processing section that provides a plurality of other functions. For example, the control section 150 may be allowed to operate as an editing processing section that changes the substance of a content displayed by the image display section 20.

The function of the operating system 141 is the function of a control program stored in the storage section 122, and the other sections are each the function of an application program executed on the operating system 141.

The image processing section 143 produces signals to be transmitted to the right display unit 22 and the left display unit 24 on the basis of image data on still images or video images to be displayed by the image display section 20. The signals produced by the image processing section 143 may be a vertical sync signal, a horizontal sync signal, a clock signal, an analog image signal, and other signals.

The image processing section 143 may carry out a resolution conversion process of converting the resolution of the image data into resolution suitable for the right display unit 22 and the left display unit 24. The image processing section 143 may further carry out an image adjustment process of adjusting the luminance and chroma of the image data, a 2D/3D conversion process of creating 2D image data from 3D image data or creating 3D image data from 2D image data, and other processes. Having carried out the image processing described above, the image processing section 143 produces signals for displaying images on the basis of the processed image data and transmits the signals to the image display section 20 via the connection cable 40.

The image processing section 143 is not necessarily achieved by the program executed by the main processor 140 and may instead be formed of hardware (DSP (digital signal processor), for example) separate from the main processor 140.

The imaging control section 145 controls the camera 61 to cause it to perform imaging for generation of captured image data. The imaging control section 145 causes the storage section 122 to temporarily store the produced captured image data. In a case where the camera 61 is configured as a camera unit including a circuit that produces captured image data, the imaging control section 145 acquires the captured image data from the camera 61 and causes the storage section 122 to temporarily store the data.

The operation controlling section 147 detects operation performed on the trackpad 14 and the operation section 110 and outputs data corresponding to the detected operation. For example, when any of the buttons or any other component on the operation section 110 is operated, the operation controlling section 147 produces operation data representing the content of the operation and outputs the operation data to the display controlling section 155. The display controlling section 155 changes the state of images displayed by the image display section 20 in accordance with the operation data inputted from the operation controlling section 147.

When operation performed on the trackpad 14 is detected, the operation controlling section 147 successively acquires the coordinates of the operation position on the trackpad 14. The operation controlling section 147 produces the trajectory of the operation positions. The trajectory of the operation positions is the trajectory of positions where operation is performed during the period for which touch operation on the trackpad 14 is not terminated, that is, during the period for which the state in which the operation element is in contact with the trackpad 14 continues.

The pointing element detecting section 149 acquires captured image data from the storage section 122 and detects a region of the user's hand and fingers (hereinafter referred to as hand/finger) (hereinafter referred to as hand/finger region) contained in the acquired captured image data. The pointing element detecting section 149 identifies the shape and position of the hand/finger seen in the detected hand/finger region. For example, the pointing element detecting section 149 extracts a flesh-color region from the captured image data region in a flesh-color extraction process and compares the pixel values in the extracted flesh-color region with a threshold in a threshold process to detect the hand/finger region. In the present embodiment, the description will be made of a case where the pointing element detecting section 149 detects the user's hand/finger as a pointing element including part of the user's body, but the pointing element detected by the pointing element detecting section 149 may instead be the user's whole arm. In a case where the user grasps a pointing rod or any other object with a hand, the pointing element detecting section 149 may detect the pointing rod as the pointing element or may detect the user's hand/finger including the pointing rod.

The head motion detecting section 151 detects the position and motion of the user's head on the basis of detection values from the six-axis sensor 235 and the magnetic sensor 237. The user's head corresponds to the "detection target section" in an aspect of the invention. The detection target section may instead be the user's upper body including the head. The six-axis sensor 235 and the magnetic sensor 237 perform sampling every predetermined cycle (50 msec, for example) and output analog voltage values representing results of the detection. The outputted voltage values are converted with an A/D converter (not shown) into digital signals and outputted to the control section 150. The six-axis sensor 235 and the magnetic sensor 237 correspond to the "detection section" of an aspect of the invention.

Angular velocity sensors provided in the six-axis sensor 235 detect rotation around the X axis shown in FIG. 1 (pitch angle), rotation around the Y axis (yaw angle), and rotation around the Z axis (roll angle) at a measurement reference point of the built-in detection mechanism. The X, Y, and Z axes are three axes perpendicular to one another, as shown in FIG. 1, with the Z-axis direction corresponding to the vertical direction, the X-axis direction corresponding to the rightward/leftward direction of the user's head, and the Y-axis direction corresponding to the frontward/rearward direction of the user's head.

The head motion detecting section 151 detects rotation around the X axis (pitch angle) on the basis of detection values from the six-axis sensor 235 to detect the user's motion of raising or lowering the face. The head motion detecting section 151 further detects rotation around the Y axis (yaw angle) on the basis of detection values from the six-axis sensor 235 to detect the user's motion of inclining the neck toward the right or left shoulder. The head motion detecting section 151 further detects rotation around the Z axis (roll angle) on the basis of detection values from the six-axis sensor 235 to detect the user's motion of turning the face clockwise or counterclockwise. In the following description, the motion of raising or lowering the face, the motion of inclining the neck toward the right or left shoulder, and the motion of turning the face clockwise or counterclockwise are collectively called head motion. Further, the X, Y, and Z axes correspond to the "axes of rotation of the detection target section" in an aspect of the invention.

The magnetic sensor 237 is a three-axis magnetic sensor that detects magnetic fields in the X-axis, Y-axis, and Z-axis directions described above. The head motion detecting section 151 detects the direction in which the user faces, that is, the orientation corresponding to the region in front of the user on the basis of detection values from the magnetic sensor 237.

The reference setting section 153 sets a reference state on the basis of at least one of the user's head position and motion detected by the six-axis sensor 235 and the magnetic sensor 237. The reference setting section 153 sets the orientation that serves as the reference of the head position or motion (hereinafter referred to as reference orientation) as the reference state. When rotation or any other motion of the user's head is detected, the control section 150 changes the display state of a content displayed by the image display section 20 with reference to the set reference orientation.

To cause the HMD 100 to set the reference orientation, the user performs first operation and second operation. The first operation is operation that causes the HMD 100 to set the reference state. For example, the user performs the first operation by performing predetermined operation on the operation surface of the trackpad 14. The first operation is not limited to operation performed on the operation surface of the trackpad 14 and may, for example, be operation performed on any of the buttons 11 or the up/down keys 15 or operation of tapping the operation surface of the trackpad 14. The first operation may still instead be the user's action of saying "set reference orientation."

Having performed the first operation, the user directs the head and the body in a direction that the user desires to set as the reference orientation. At this point, the user's head may face obliquely upward or downward. Having faced in the direction that the user desires to set as the reference orientation, the user performs the second operation. The second operation is preferably operation that causes smallest possible user's head motion so that no shift in the set reference orientation occurs. The second operation may, for example, be preset operation performed on the trackpad 14 or the operation section 110.

The reference setting section 153, when it determines on the basis of detection values from the six-axis sensor 235 that the user's head has been stationary for at least a predetermined period, may set the orientation in which the stationary head faces as the reference orientation. That is, the reference orientation may be set with no second operation performed.

The second operation may instead be operation performed on an operation device 3 worn on the user.

Figure 6:
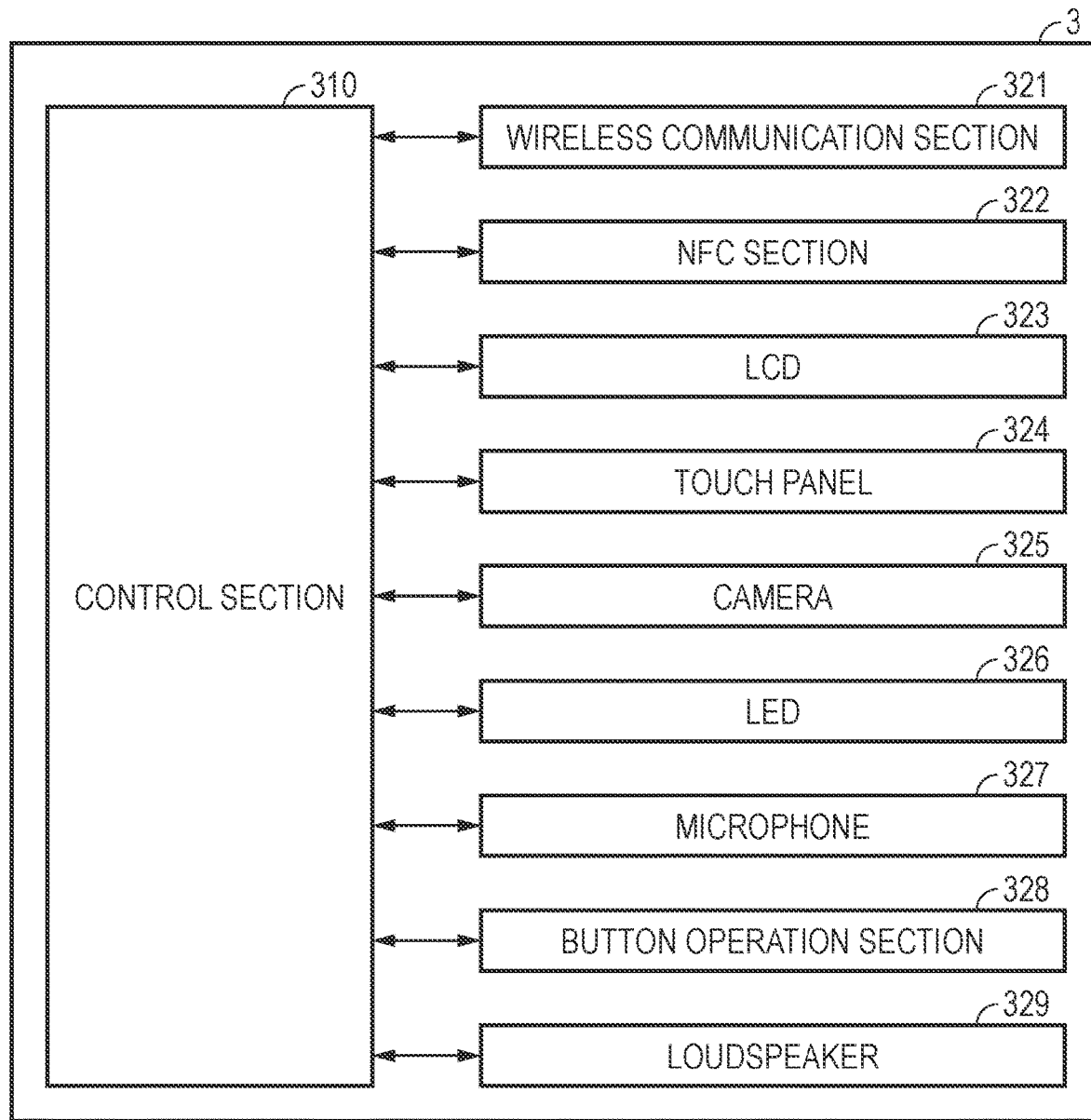
FIG. 6 is a block diagram showing the configuration of an operation device.

The operation device 3 will now be described. FIG. 6 is a block diagram showing the configuration of the operation device 3.

The operation device 3 will now be described.

The operation device 3 includes a control section 310, which controls each portion of the operation device 3. The control section 310 includes a CPU, a ROM, a RAM, and other components that are not shown and executes a program stored in the ROM to achieve the function of the operation device 3.

The operation device 3 includes a wireless communication section 321 and an NFC (near field communication) section 322 as functional portions for communication.

The wireless communication section 321 performs wireless data communication compliant with a wireless LAN (WiFi (registered trademark)), Miracast (registered trademark), Bluetooth, or any other standard. The NFC section 322 performs short-range wireless communication compliant with the NFC standard.

An LCD (liquid crystal display) 322, a touch panel 324, a camera 325, and an LED (light emitting diode) 325 are connected to the control section 310.

The control section 310 controls the LCD 323 to cause it to display an image and letters. The touch panel 324 is so disposed as to be overlaid on the surface of the LCD 323 and detects contact operation performed on the surface of the LCD 323. The touch panel 324 can, for example, be an electrostatic capacitance or pressure sensitive sensor. The control section 310 detects contact operation via the touch panel 324 and identifies an operation position.

The control section 310 further controls the camera 325 to cause it to perform imaging to produce captured image data. The control section 310 further causes current to flow through the LED 326 and stops supplying the LED 326 with the current so that the LED 326 illuminates or blinks at an arbitrary timing.

A microphone 327, a button operation section 328, and a loudspeaker 329 are connected to the control section 310. The microphone 327 may be a monaural microphone, a stereo microphone, a directional microphone, or an omnidirectional microphone. The control section 310 acquires an analog voice signal representing voice collected with the microphone 327 to produce digital voice data.

The button operation section 328 detects operation performed on any of buttons provided on the operation device 3 and outputs an operation signal corresponding to the operated button to the control section 310.

The loudspeaker 329 outputs voice on the basis of a voice signal outputted by the control section 310.

The description of the first operation and the second operation described above will be resumed. Having faced in the direction that the user desires to set as the reference orientation, the user operates the operation device 3. The operation of the operation device 3 may, for example, be operation performed on a switch or a button provided on the operation device 3 or operation of knocking the surface of the operation device 3. The operation device 3, when it detects a knock sound via the microphone 327, transmits a signal representing that the HMD 100 has accepted the second operation.

The reference setting section 153, when it accepts the second operation, acquires detection values from the six-axis sensor 235 and the magnetic sensor 237. The reference setting section 153 detects the axis of rotation of the head and the position of the head that rotates around the axis of rotation on the basis of the acquired detection values to set the reference orientation. For example, the reference setting section 153 detects the orientation in which the user's head faces (orientation angle) on the basis of detection values from the magnetic sensor 237. In this case, the axis of rotation of the head is the Z axis (vertical direction), and the position of the head that rotates around the axis of rotation is the orientation angle detected on the basis of the detection values from the magnetic sensor 237.

The reference setting section 153 may instead detect the angle of elevation or depression, which is the inclination of the head, as the reference state. The reference setting section 153 detects the angle of rotation of the head around the X axis (pitch angle) on the basis of detection values from the angular velocity sensors provided in the six-axis sensor 235. The detected angle of rotation around the X axis is the inclination (angle of elevation or depression) with respect to the plane containing the X axis set along the rightward/leftward direction of the head and the Y axis set along the frontward/rearward direction of the head (hereinafter referred to as horizontal plane). In this case, the axis of rotation of the head is the X axis, and the position of the head is the detected angle of elevation or depression.

The reference setting section 153 sets the detected orientation angle as the reference orientation and causes the storage section 122 to store information representing the axis of rotation of the head and the reference orientation and information representing the angle of elevation or depression as the display position information 125.

The reference setting section 153 may set the reference state on the basis of the user's sightline directions detected with the sightline sensors 68 as well as detection values from the six-axis sensor 235 and the magnetic sensor 237. Setting the reference state on the basis of the user's sightline directions allows the user's sightline directions to be set as the reference state and therefore allows a content to be so displayed as to be located in the user's sightline directions.

Further, as the detection section that detects the position or motion of the head, the GPS receiver 115 or the camera 61 may be used in addition to the six-axis sensor 235 and the magnetic sensor 237. Using these functional sections as the detection section allows an increase in the accuracy in detection of the position and motion of the head.

The reference setting section 153 may set, as the reference direction, the direction in which the strength of the received electromagnetic wave used in the short-range wireless communication, such as Bluetooth and BLE (Bluetooth Low Energy), and transmitted from a transmitter (not shown) is maximized. Still instead, the reference state may be set on the basis of operation performed on the operation device 3 in place of the action of the user's head. For example, the user directs the surface of the operation device 3 in a direction set as the reference orientation. The operation device 3, in which a six-axis sensor and a magnetic sensor are incorporated, transmits detection values from the sensors to the HMD 100. The reference setting section 153 receives the detection values detected with the sensors and transmitted from the operation device 3 via the communication section 117 and sets the reference state on the basis of the received detection values.

The display controlling section 155 produces control signals that control the right display unit 22 and the left display unit 24, and the control signals control the right display unit 22 and the left display unit 24 to cause them to produce and output image light. Specifically, the display controlling section 155 controls the OLED drive circuits 225 and 245 to cause the OLED panels 223 and 243 to display images. The display controlling section 155 controls the timing when the OLED drive circuits 225 and 245 draw images in the OLED panels 223 and 243, controls the luminance of the images displayed by the OLED panels 223 and 243, and performs other types of control on the basis of the signals outputted by the image processing section 143.

Figure 7:
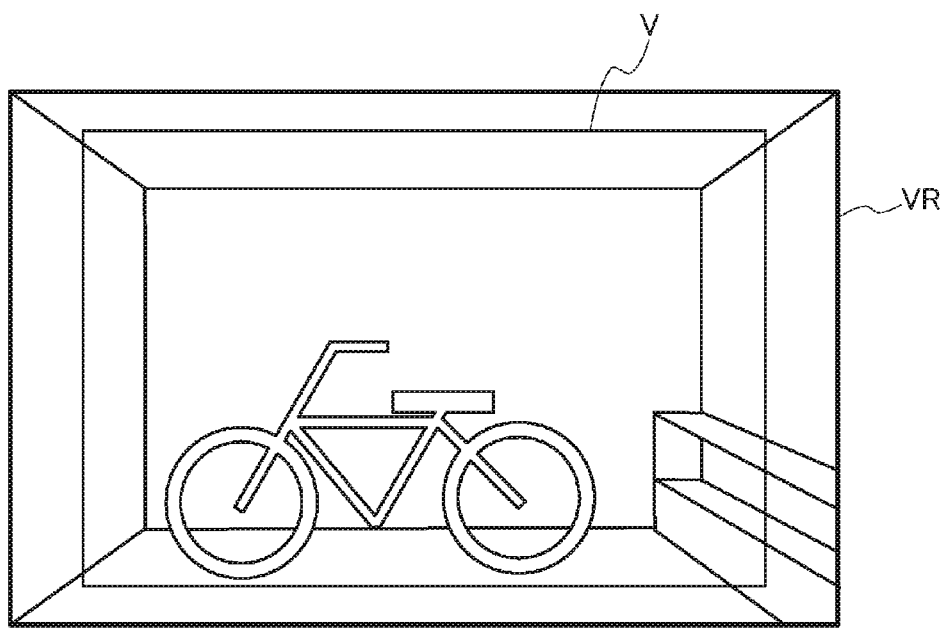
FIG. 7 shows a visual field visually recognized by a user through the image display section.

The display controlling section 155 further performs calibration to produce a parameter that relates the coordinates in a display region V to an image captured with the camera 61. FIG. 7 shows a visual field VR visually recognized by the user through the image display section 20.

The user visually recognizes through the image display section 20 a person, a building, a road, and other objects (hereinafter collectively referred to as target object) present in a real world (hereinafter referred to as outside scene) and a content displayed by the image display section 20. When the image display section 20 reproduces the content data 124 under the control of the control section 150, a content is reproduced in the display region V. The display region V is a region where the image display section 20 can display a content.

The display controlling section 155 causes the image display section 20 to display a calibration image and recognizes and tracks a reference actual object corresponding to the calibration image on the basis of captured image data from the camera 61. In this state, the user moves the position of the calibration image on the image display section 20 via a user interface, such as the trackpad 14. The user then notifies the display controlling section 155 via the user interface at the timing when the user perceives that the calibration image is superimposed on the reference actual object (at least one of position, size, and orientation of calibration image roughly coincides with that of reference actual object). The display controlling section 155 produces, in response to the acquired notification, a parameter that relates a result of the detection of the reference actual object (position in captured image data) at the timing described above to the position where the calibration image is displayed in the display region V. The display controlling section 155 causes the storage section 122 to store the produced parameter.

The parameter is used, for example, when a content or a target object in a region pointed by the user with the hand/finger is specified.

The display controlling section 155 changes the display state of a content displayed in the display region V by the image display section 20 on the basis of the head motion (change in position of head) detected by the six-axis sensor 235 and the magnetic sensor 237. The content displayed in the display region V may, for example, be a document file created, for example, by Word or Excel or may be a motion image file or a still image file. The motion image file or the still image file may be a file stored in the storage section 122 in advance or may be a file downloaded over a network under the control of the communication section 117.

The coordinate setting section 157 sets virtual three-dimensional spatial coordinates on the basis of the reference orientation set by the reference setting section 153. The coordinate setting section 157 in the present embodiment sets spherical coordinates, which are coordinates in a spherical coordinate system with the user's head located at the center of the coordinate system. The spherical coordinates are expressed by three-dimensional polar coordinates specified by the distance from the origin, which is the user's head, and two angles of deviation. The two angles of deviation are specified by an angle with respect to the orientation set as the reference orientation by the reference setting section 153 and an angle with respect to the Z-axis direction, which is the vertical direction.

A content used by the user via the display controlling section 155 is related to spherical coordinates set by the coordinate setting section 157. When the user starts an application, the display controlling section 155 relates a content displayed by the application to coordinates in the spherical coordinate system. In a case where a plurality of contents are related to coordinates in the spherical coordinate system, the display controlling section 155 relates the contents to coordinates in the spherical coordinate system in such a way that relative display positions of the plurality of contents are maintained. The coordinate setting section 157 then produces, as the display position information 125, information for identification of the application that displays the content and information representing the size of the display region where the content displayed by the application is displayed and the coordinates in the spherical coordinate system to which the content is related and causes the storage section 122 to store the produced information.

The user can start a plurality of applications and cause a plurality of contents to be displayed in the display region V. In the case of the HMD 100, however, when the number of contents displayed in the display region V increases, the visibility of the outside is hindered by the contents in some cases. Although a plurality of contents are displayed, the user does not simultaneously operate the plurality of contents, and some of the contents may not be temporarily used in some cases. In a case where a content that is not temporarily used is terminated for a while and started again when the user desires to use the content, it undesirably takes time to start the application. It is therefore required not to display a content that is not temporarily used in the display region V.

Figure 8:
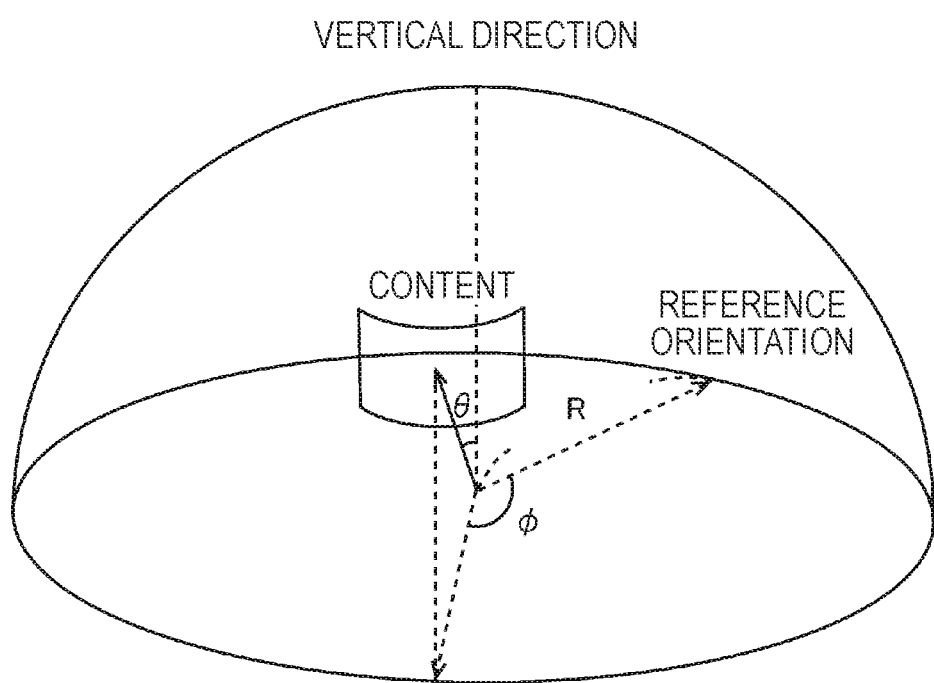
FIG. 8 shows a content related to coordinates in a spherical coordinate system.

FIG. 8 shows a content related to coordinates in the spherical coordinate system.

When an application is started, the coordinate setting section 157 relates a content displayed by the application to coordinates in the spherical coordinate system. FIG. 8 shows that a content is related to coordinates in the spherical coordinate system that correspond to an angle of deviation φ with respect to the reference orientation, an angle of deviation θ with respect to the vertical direction, and a distance R from the origin. In a case where the content is displayed in the form of a rectangle, the coordinates related to the content may relate the angles of deviation θ and φ and the distance R to each of the four corners of the rectangle.

When motion of the head is detected by the head motion detecting section 151, the display controlling section 155 moves the display region V, which represents the display range of the image display section 20, in the spherical coordinate system in correspondence with the detected head's motion. In a case where the set coordinates of the content fall within the moved display region V, the display controlling section 155 causes the image display section 20 to display the content.

Figure 9:
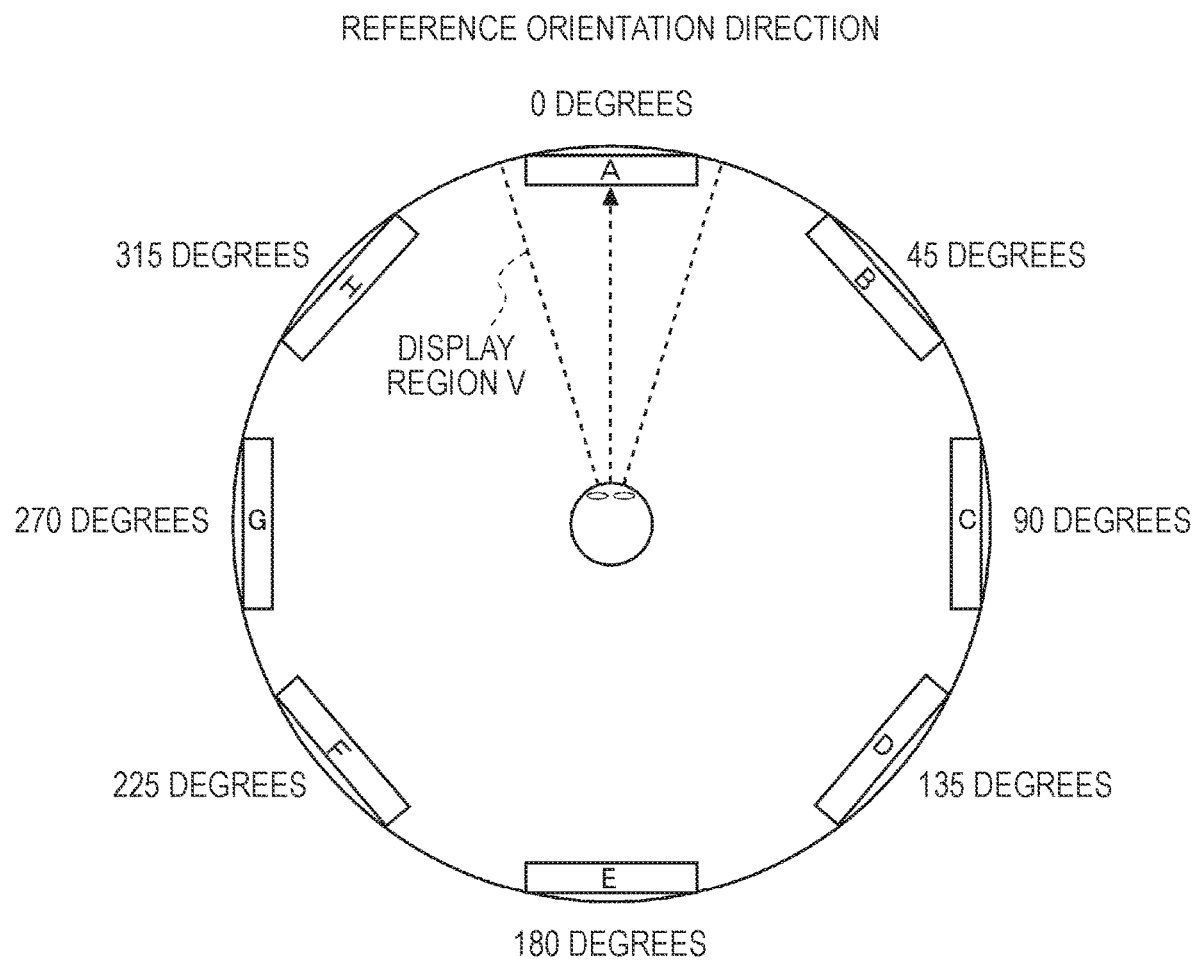
FIG. 9 is a top view showing the user and contents set at coordinates in the spherical coordinate system.
Figure 10:
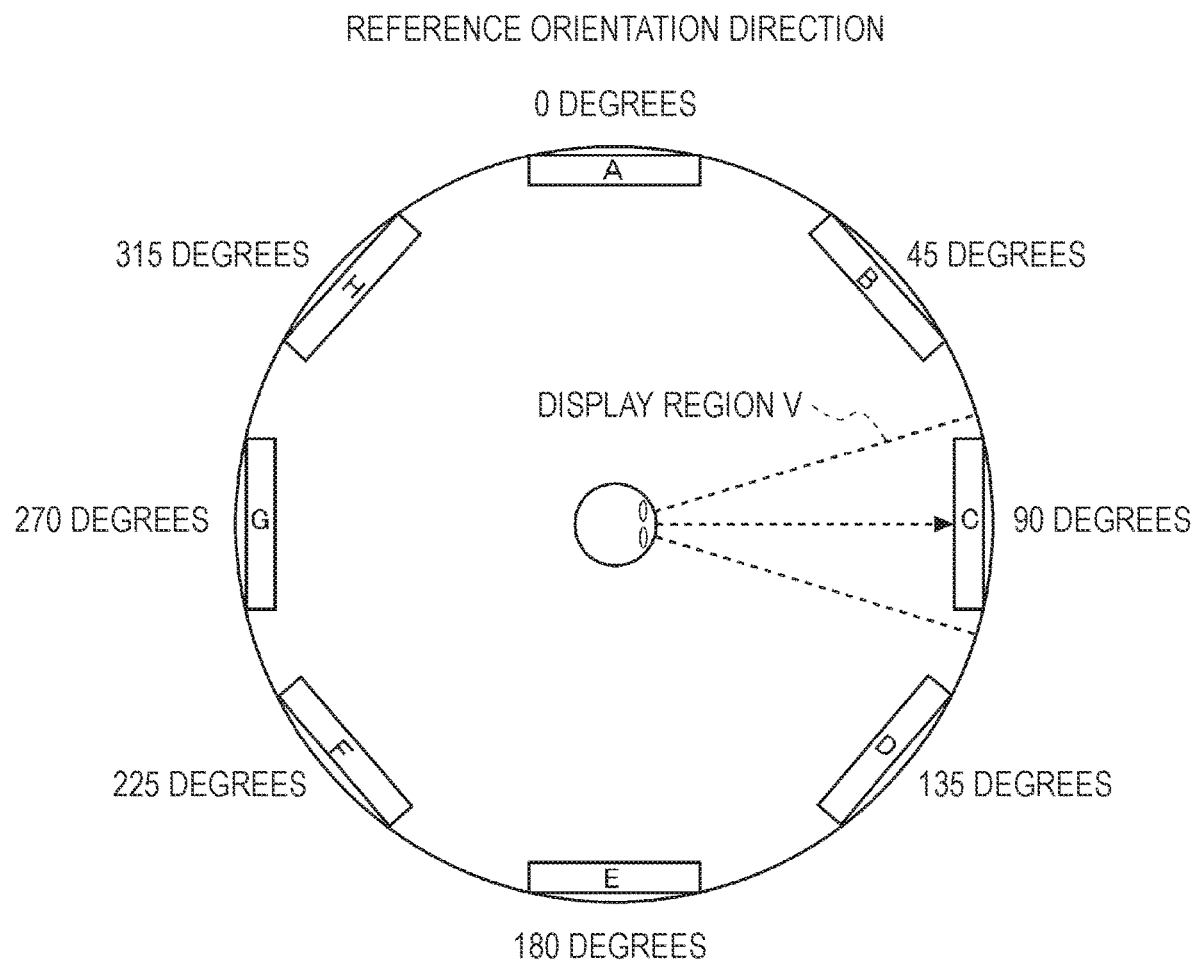
FIG. 10 is a top view showing the user and the contents set at the coordinates in the spherical coordinate system.

FIGS. 9 and 10 are top views showing the user and contents set in the spherical coordinate system.

FIGS. 9 and 10 show a state in which a content A is set in the 0-degree direction, which is the reference orientation direction, and a content B is set in the direction rotated clockwise from the reference orientation by 45 degrees. Similarly, a content C is set in the direction rotated clockwise from the reference orientation by 90 degrees, a content D is set in the 135-degree direction, and a content E is set in the 180-degree direction. FIGS. 9 and 10 further show a state in which a content F is set in the direction rotated clockwise from the reference orientation by 225 degrees, a content G is set in the 270-degree direction, and a content H is set in the 315-degree direction. The angles 135 degrees, 180 degrees, and 225 degrees correspond to the rear of the user, and contents can be set on the rear of the user who faces in the reference orientation direction.

In a case where the user desires to visually recognize another content in the spherical coordinate system, the user rotates the head in such a way that the head faces in the direction where the content that the user desires to visually recognize is set. The head motion detecting section 151 detects the direction of the rotation of the head and the angle of rotation of the head on the basis of detection values from the six-axis sensor 235. The display controlling section 155 moves the display region V in the spherical coordinate system in accordance with the direction of the rotation of the head and the angle of rotation of the head detected by the head motion detecting section 151. In a case where the coordinates of the set content are present in the moved display region V, the display controlling section 155 causes the content to be displayed in the display region V. FIG. 9 shows a case where the user faces in the 0-degree direction, which is the reference orientation direction. In this case, since the coordinates of the content A are present in the display region V, the display controlling section 155 causes the content A to be displayed in the display region V. FIG. 10 shows a case where the user turns clockwise from the reference orientation direction by 45 degrees. In this case, since the coordinates of the content C are present in the display region V, the display controlling section 155 causes the content C to be displayed in the display region V.

Figure 11:
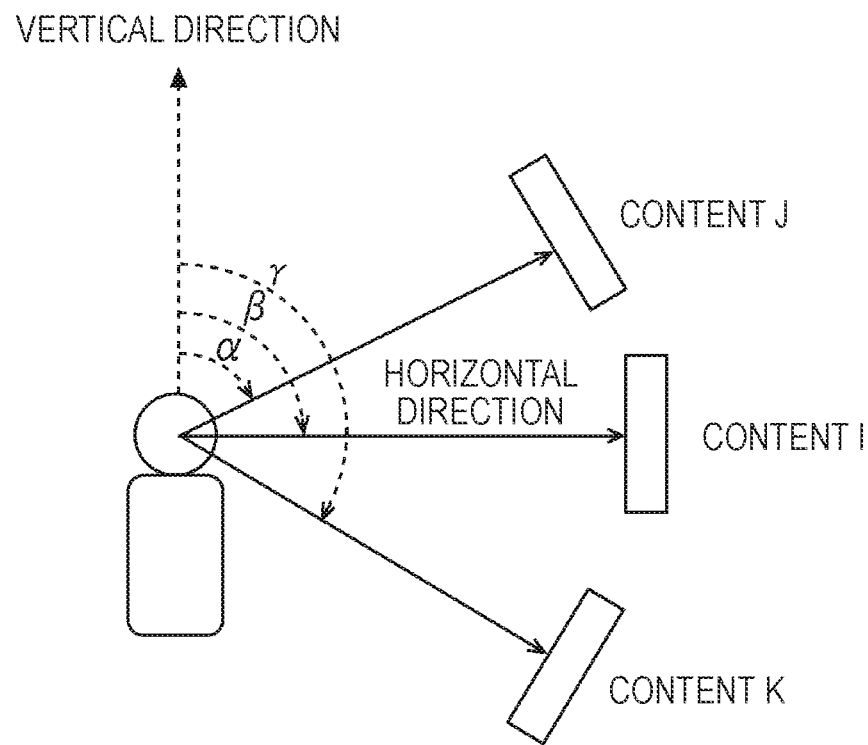
FIG. 11 shows the user and contents set at coordinates in the spherical coordinate system.

FIG. 11 shows the user and contents set in the spherical coordinate system. In particular, FIG. 11 is a side view of the user.

A plurality of contents can be related to a single orientation angle direction in the spherical coordinate system. That is, contents can be related to directions perpendicular to the direction of rotation described above. Specifically, contents can be related to spherical coordinates by changing the angle of deviation θ with respect to the vertical direction.

FIG. 11 shows a content J related to coordinates where the angle of deviation θ is "α", a content I related to coordinates where the angle of deviation θ is "β", and a content K related to coordinates where the angle of deviation θ is "γ". The coordinates α, β, and γ satisfy α<β<γ.

The user can visually recognize the content I in the display region V by causing the head to face in the horizontal direction (direction in which angle of deviation θ is 90 degrees) and can visually recognize the content J in the display region V by causing the head to face in an obliquely upward direction. The user can further visually recognize the content K in the display region V by causing the head to face in an obliquely downward direction.

Figure 12:
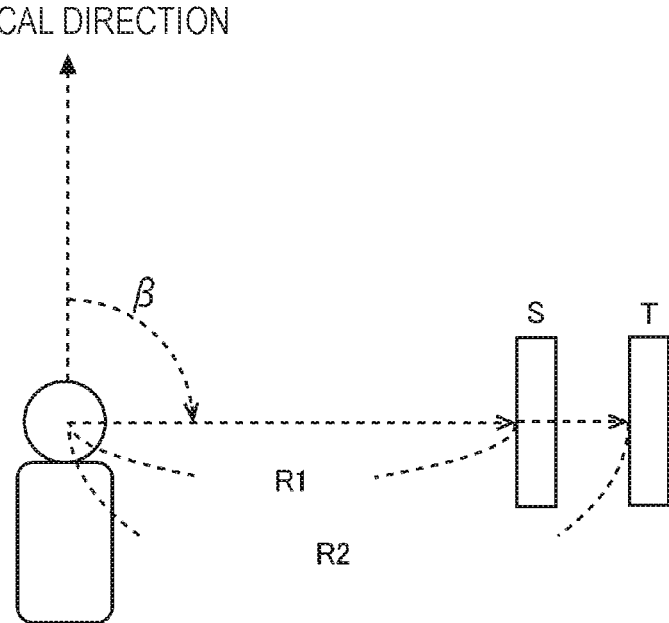
FIG. 12 shows the user and contents set at coordinates in the spherical coordinate system.

FIG. 12 shows the user and contents set at coordinates in the spherical coordinate system.

Contents related to spherical coordinates may instead be set by changing the distance R from the user. That is, contents may be disposed in different positions in the direction extending from the near side toward the far side with respect to the user's head.

FIG. 12 shows a content S, which is separate from the origin by a distance R1 and related to coordinates where the angle of deviation θ with respect to the vertical direction is "β", and a content T, which is separate from the origin by a distance R2 and related to the coordinates where the angle of deviation θ with respect to the vertical direction is "β".

When the user faces in the direction toward the spherical coordinates where the contents S and T are set, the contents S and T are displayed in the display region V. The user operates, for example, the trackpad 14, the operation section 110, or the operation device 3 to select a content to be operated or displayed. When the user selects one of the contents, the display controlling section 155 changes the visibility of the contents in such a way that the visibility of the selected content differs from the visibility of the non-selected content. For example, the display controlling section 155 increases the transparency of the non-selected content as compared with the transparency of the selected content or increases the luminance of the selected content as compared with the luminance of the non-selected content.

Further, the selected content may be clearly displayed by displaying a tag in an end portion of each of the contents S and T and causing the portion of the tag in the selected content to blink or to be displayed in a different color.

In a case where the user faces in the direction toward coordinates related to no content, a plurality of contents closest to the coordinates may be displayed.

For example, assume a state in which a content is related to coordinates having the 0-degree deviation angle with respect to the reference orientation and a content is related to coordinates having the 90-degree deviation angle ϕ with respect to the reference orientation. In this state, when the user faces in the direction corresponding to the 45-degree deviation angle ϕ, the content related to the 0-degree coordinates and the content related to the 90-degree coordinates may both be displayed. That is, in a case where the user faces the coordinates at the middle between the coordinates related to one of the contents and the coordinates related to the other content, the contents are both displayed.

The user desires in some cases to perform a task with a plurality of contents simultaneously displayed in the display region V. In such cases, displaying two contents in the coordinates at the middle between the coordinates related to the contents allows improvement in efficiency at which the user performs the task.

The user can change a content and the coordinates in the spherical coordinate system that are related to the content. For example, the display controlling section 155 may cause angles of deviation ϕ, such as 45 degrees, 90 degrees, 135 degrees, and 180 degrees, and thumbnail images of contents related to the angles of deviations ϕ to be displayed in an end portion of the display region V. The user may operate the trackpad 14, the operation section 110, or the operation device 3, while referring to the displayed contents in the display region V, to change the coordinates (angles of deviation ϕ and ϕ, distance R) in the spherical coordinate system that are related to each of the contents.

Figure 13:
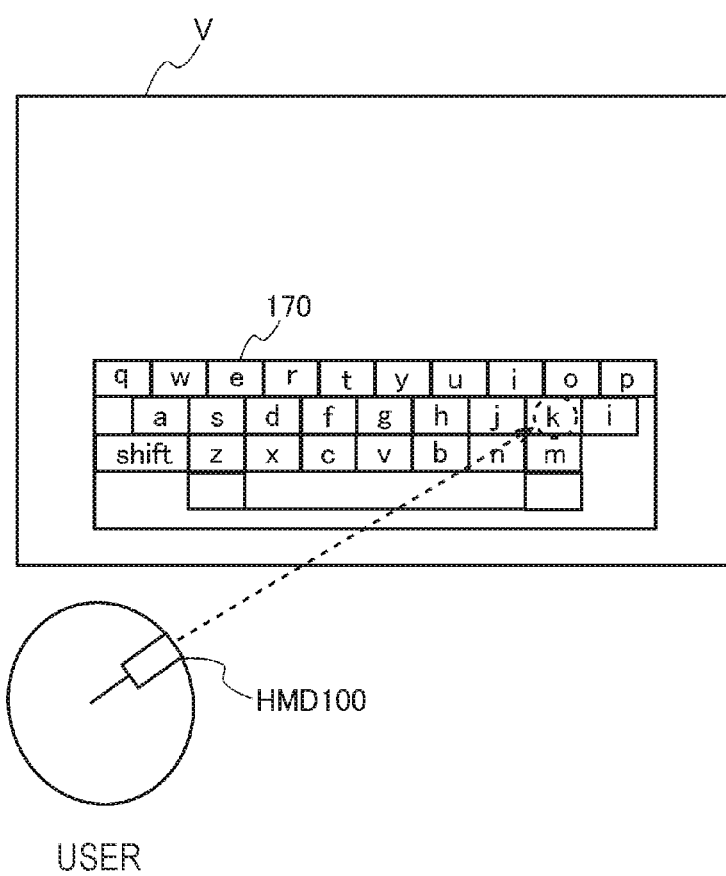
FIG. 13 shows that input operation is performed on the basis of sightlines detected with sightline sensors.

FIG. 13 shows that input operation is performed on the basis of the sightlines detected with the sightline sensors 68.

Having started an application and caused a content to be displayed in the display region V, the user performs operation on the displayed content.

For example, in a case where the started application is browser software, the display controlling section 155 may display a software keyboard 170 as a content for input to allow the user to input a keyword in the search field in the browser screen displayed by the browser software. The software keyboard 170 may be operated as follows: The directions of the user's sightlines are detected with the sightline sensors 68; and a key corresponding to the sightline directions is determined to be the operated key on the software keyboard 170.

A key of the software keyboard 170 may instead be selected on the basis of an image captured with the camera 61.

The control section 150 causes the camera 61 in the image display section 20 to capture an image of the user's hand/finger and detects a hand/finger region where the hand/finger is seen on the basis of the captured image. The control section 150 identifies the shape of the hand/finger on the basis of the detected hand/finger region to identify a key of the software keyboard 170 or the key that overlaps with the front end of the hand/finger. To identify a key of the software keyboard 170 or the key that overlaps with the front end of the hand/finger, the parameter produced by the calibration is used. The control section 150 uses the parameter to convert the coordinates of the hand/finger region in the captured image into the coordinates in the display region V and identifies a key of the software keyboard 170 or the key that overlaps with the front end of the hand/finger.

A key of the software keyboard 170 may instead be selected by operating a cursor displayed in the display region V.

The cursor is moved over the software keyboard 170 in accordance with the user's operation of the trackpad 14, the operation section 110, or the operation device 3. The control section 150, when it accepts finalizing operation performed on the trackpad 14, the operation section 110, or the operation device 3, identifies a key of the software keyboard 170 or the key that corresponds to the position of the cursor at the time when the finalized operation is accepted and determines the selected key.

The cursor may instead be moved over the software keyboard in accordance with the motion of the user's hand/finger or head.

In the case where the cursor is moved by the user's hand/finger, the control section 150 detects a hand/finger region where the user's hand/finger is seen on the basis of an image captured with the camera 61. The control section 150 uses, for example, a recognition dictionary to identify the shape of the hand/finger on the basis of the detected hand/finger region and moves the cursor in the direction pointed by the hand/finger. The recognition dictionary is information for identifying the shape and position of the hand/finger and is stored in the storage section 122.

In the case where the cursor is moved by detected motion of the user's head, the control section 150 moves the cursor on the basis of detection values from the six-axis sensor 235. For example, in a case where the user rotates the head clockwise, that is, in a case where rotation of the head around the Z axis is detected, the control section 150 moves the cursor rightward by a predetermined distance. The same holds true for a case where the user rotates the head counterclockwise. In a case where the user directs the head upward, the control section 150 detects the angle of rotation of the head around the X axis and moves the cursor upward in accordance with the detected angle of rotation. The same holds true for a case where the user directs the head downward.

When the cursor overlaps with a key of the software keyboard 170 that the user desires to select, the user performs finalizing operation of finalizing the key. The finalizing operation may be operation performed on the trackpad 14, the operation section 110, or the operation device 3. In the case where the cursor is moved in accordance with the orientation of the user's hand/finger, the finalizing operation may be performed by the motion of the user's head, and in the case where the cursor is moved in accordance with the motion of the user's head, the finalizing operation may be performed by the user's hand/finger.

Figure 14:
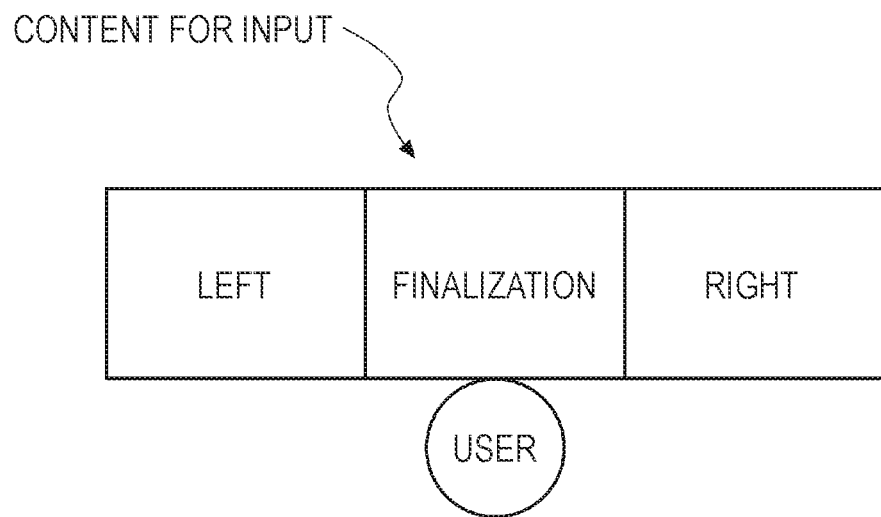
FIG. 14 shows an example of an image displayed at the user's feet.

FIG. 14 shows an example of the content for input displayed at the user's feet.

For example, the spherical coordinate system may be so set as to surround the user (that is, the spherical coordinate system may be so set that the user is located at the center of the spherical coordinate system), and the content for input or any other content may be displayed at the user's feet. The control section 150 causes a content for input to be displayed at the user's feet, and the content for input includes an image showing cursor movement directions corresponding to the rightward and leftward directions and an image showing the finalizing operation, as shown in FIG. 14. The control section 150 causes the content for input to be so displayed that the user is located at the center of the content for input.

The user instructs the HMD 100 in the cursor movement direction by stepping on the image showing the movement direction. Having moved the cursor, the user steps on the image showing the finalizing operation. The operation allows the HMD 100 to determine that a key that overlaps with the cursor has been selected.

When stepping on an image, the user directs the head downward so that the user's feet fall within the imaging range of the camera 61. The control section 150 evaluates the selected image on the basis of the image captured with the camera 61. For example, in a case where a foot has stepped rightward, the control section 150 determines that the image that instructs the cursor to move rightward has been selected. In a case where a foot has stepped leftward, the control section 150 determines that the image that instructs the cursor to move leftward has been selected. In a case where a foot has stepped forward to a point in front of the body, the control section 150 determines that the finalizing operation has been inputted.

The control section 150 may change the images displayed at the user's feet when the control section 150 accepts operation performed on the trackpad 14, the operation section 110, or the operation device 3. For example, the control section 150 may cause a content for input to be displayed at the user's feet, and the content for input may include images showing cursor movement directions corresponding to the upward and downward directions and the image showing the finalizing operation. Further, an image captured with the camera 325, which is incorporated in the operation device 3, may be used to determine a selected image.

Figure 15:
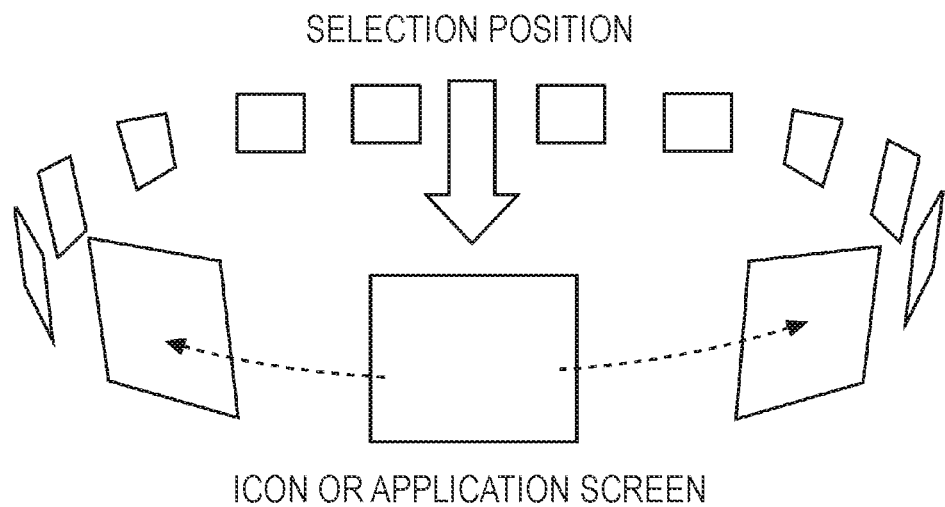
FIG. 15 shows an image for selecting an application or an application screen.

FIG. 15 shows an image for selecting an application or an application screen. An application screen is a screen displayed by an application.

To select an application to be started from applications installed on the HMD 100, the control section 150 may cause the image display section 20 to display an image in which icons representing the applications are arranged in the form of a circle. Further, with the plurality of applications started, to select an application screen to be displayed in the display region V, the control section 150 may cause the image display section 20 to display an image in which the application screens are arranged in the form of a circle. The control section 150 produces an image showing the application screens arranged in accordance with their coordinates related to spherical coordinate system and causes the image display section 20 to display the image in the display region V.

To select an application or an application screen from the image in which the application representing icons or the application screens are arranged, the user may operate the trackpad 14, the operation section 110, or the operation device 3 to select the application or the application screen or may select the application or the application screen through operation performed by the user's foot.

To select an application or an application screen, the user causes the head to face downward and steps forward with the right or left foot by one step. That is, the user allows the user's right or left foot to be imaged with the camera 61, which is incorporated in the image display section 20.

The control section 150 evaluates the foot with which the user has stepped forward on the basis of the image captured with the camera 61. For example, in a case where the right foot is seen in the captured image, the control section 150 rotates clockwise the image in which the applications or the application screens are displayed. In a case where the left foot is seen in the captured image, the control section 150 rotates counterclockwise the image in which the applications or the application screens are displayed. In a case where an application or an application screen is stationary in a selection position shown in FIG. 15 for at least a period set in advance, the control section 150 determines that the application or the application screen has been selected, starts the selected application or causes the selected application screen to be displayed in the display region V.

Figure 16:
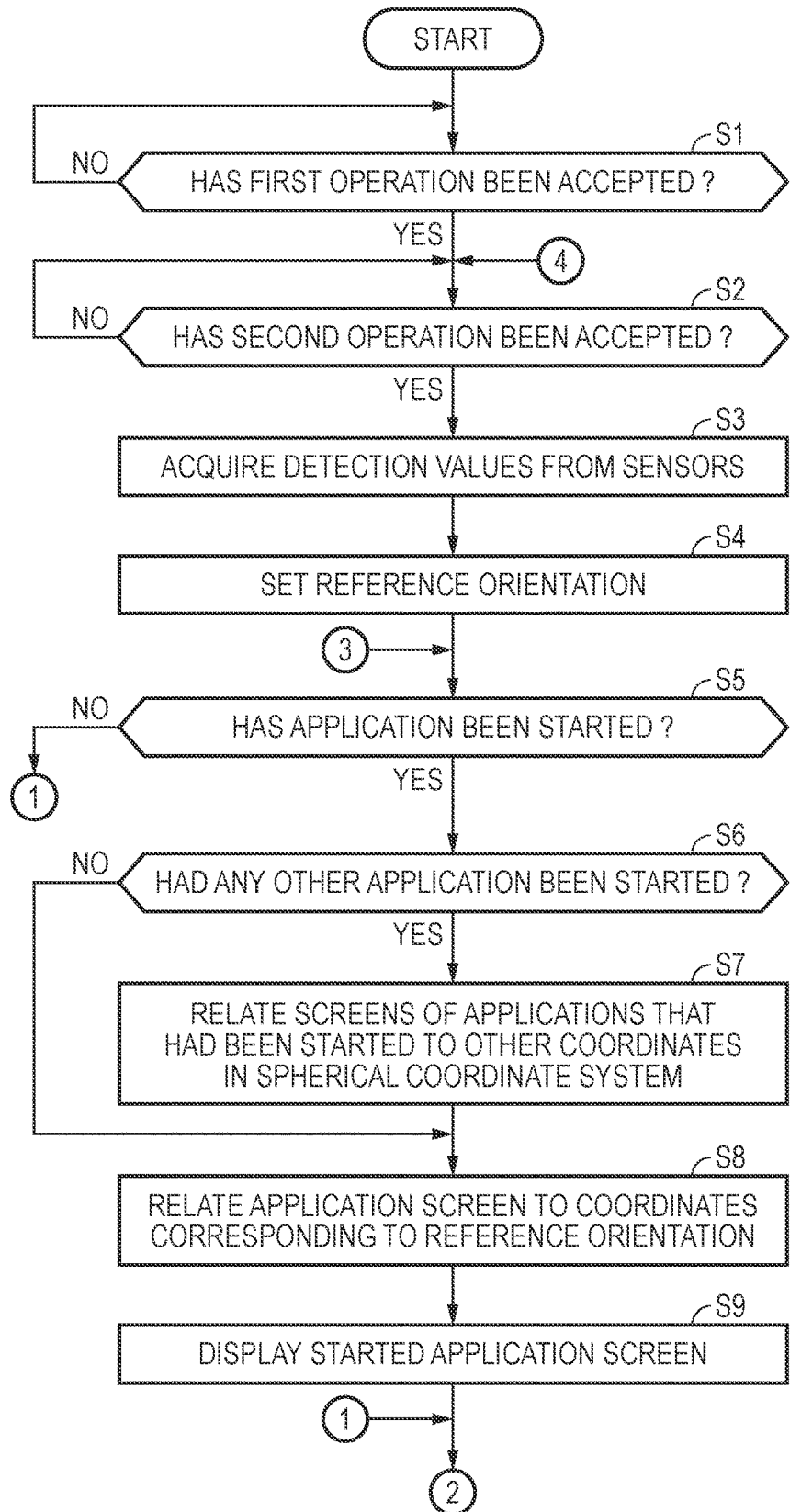
FIG. 16 is a flowchart showing the action of the HMD.
Figure 17:
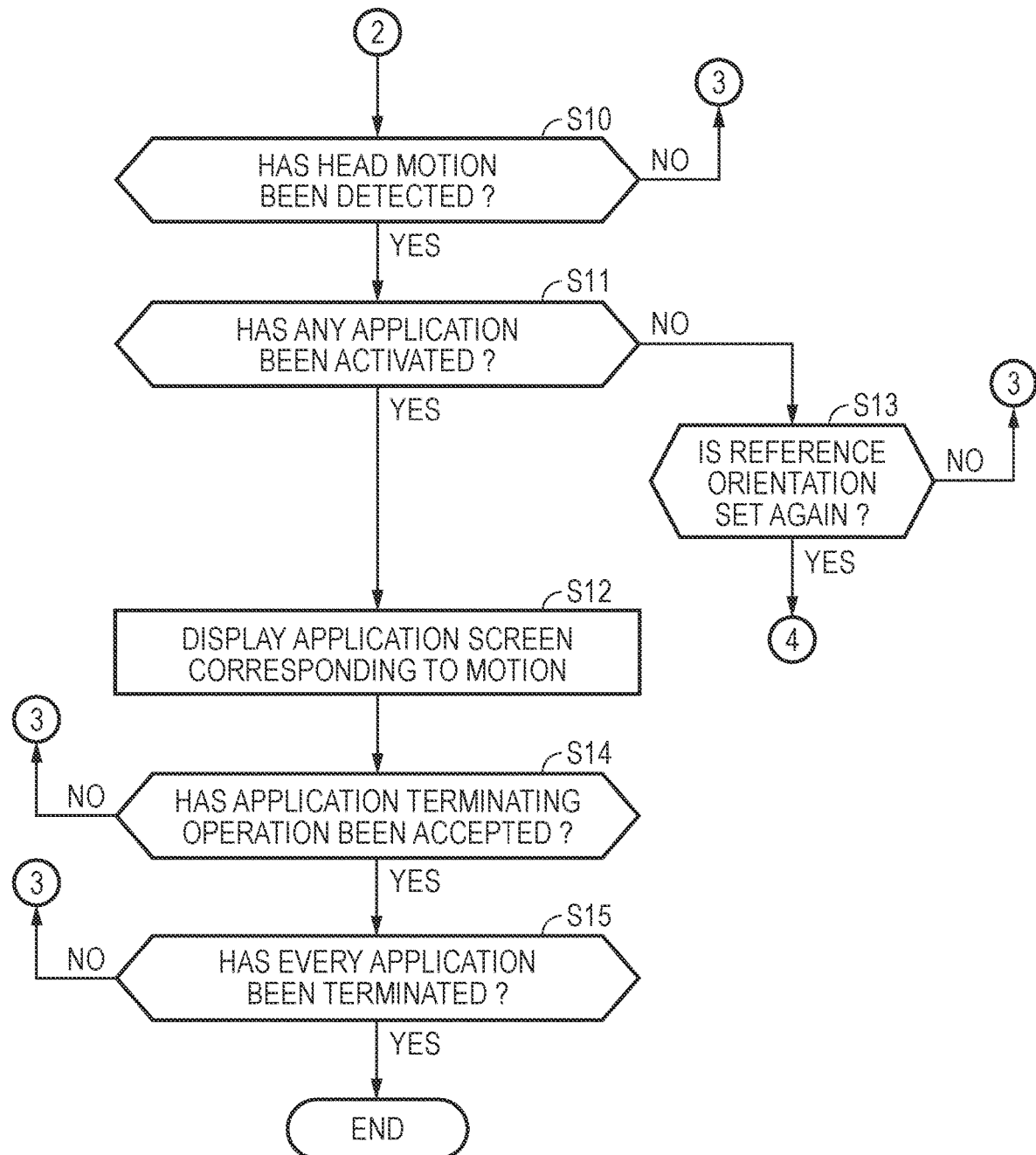
FIG. 17 is a flowchart showing the action of the HMD.

FIGS. 16 and 17 are flowcharts showing the action of the HMD 100.

The control section 150 sets the reference state. To this end, the control section 150 first evaluates whether or not it has accepted the first operation (step S1). In a case where a result of the evaluation is negative (NO in step S1), the control section 150 waits until it accepts the first operation. In a case where a result of the evaluation is affirmative (YES in step S1), the control section 150 evaluates whether or not it has accepted the second operation (step S2). In a case where a result of the evaluation is negative (NO in step S2), the control section 150 waits until it accepts the second operation. In a case where a result of the evaluation is affirmative (YES in step S2), the control section 150 acquires detection values from the six-axis sensor and the magnetic sensor 237 (step S3).

The control section 150 then sets the axis of rotation of the head on the basis of the detection values acquired from the six-axis sensor and the magnetic sensor 237 and sets the reference orientation on the basis of the axis of rotation of the head and the position of the head having rotated around the axis of rotation (step S4).

The control section 150 then evaluates whether or not it has accepted operation that starts an application (step S5). In a case where a result of the evaluation is negative (NO in step S5), the control section 150 proceeds to the evaluation in step S10. The evaluation in step S10 will be described later. In a case where a result of the evaluation is affirmative (YES in step S5), the control section 150 evaluates whether or not any other application had been started (step S6).

In a case where a result of the evaluation in step S6 is negative (NO in step S6), the control section 150 relates the screen of the started application (hereinafter referred to as application screen) to the coordinates in the spherical coordinate system that correspond to the direction of the reference orientation set in step S4 (step S8). In a case where a result of the evaluation in step S6 is affirmative (NO in step S6), the control section 150 relates the screens of the applications that had been started to other coordinates in the spherical coordinate system (step S7). The control section 150 then relates the started application screen to the coordinates in the spherical coordinate system that correspond to the direction of the reference orientation set in step S4 (step S8). The control section 150 then causes the image display section 20 to display the started application screen in the display region V (step S9).

The processes in steps S5 to S9 will be described in more detail.

The description will be made on the assumption that the user's head faces in the reference orientation direction set in the reference state setting action.

For example, when the user starts an application, the display controlling section 155 causes the image display section 20 to display the screen displayed by the application (hereinafter referred to as application screen A). The display controlling section 155 further relates the application screen A to coordinates in the spherical coordinate system. Specifically, the display controlling section 155 relates the application screen A to the coordinates in the spherical coordinate system where the angle of deviation $\phi$ is 0 degrees. In the following description, it is assumed that the distance R to which an application screen is related and the angle of deviation $\phi$ with respect to the vertical direction to which the application screen is related are set at the same values, and no description of the distance R and the angle of deviation $\phi$ will be made.

With the application screen A displayed in the display region V, when the user starts a next application (hereinafter referred to as application B), the display controlling section 155 changes the coordinates of the application screen A in the spherical coordinate system.

The display controlling section 155 determines that the probability of selection of the screen of the started application B (hereinafter referred to as application screen B) as a target to be used or displayed is higher than the probability of selection of the application screen A. The display controlling section 155 therefore, for example, relates the application screen A to the coordinates where the angle of deviation $\phi$ is 90 degrees and relates the application screen B to the position where the angle of deviation $\phi$ is 0 degrees. Since the user's head faces in the direction corresponding to the angle of deviation $\phi$ of 0 degrees, the application screen B is displayed in the display region V.

Thereafter, with the application screen B displayed in the display region V, when the user starts a next application (hereinafter referred to as application C), the display controlling section 155 changes the coordinates of the application screens A and B in the spherical coordinate system.

Also in this case, the display controlling section 155 determines that the probability of selection of the screen of the started application C (hereinafter referred to as application screen C) as a target to be used or displayed is higher than the probability of selection of the application screen A or B. The display controlling section 155 therefore, for example, relates the application screen A to the coordinates where the angle of deviation $\phi$ is 180 degrees and relates the application screen B to the coordinates where the angle of deviation $\phi$ is 90 degrees. The display controlling section 155 then relates the application screen C to the position where the angle of deviation $\phi$ is 0 degrees. Since the user's head faces in the direction corresponding to the angle of deviation $\phi$ of 0 degrees, the application screen C is displayed in the display region V.

In a case where the user desires to display the application screen A of the application A during operation of the application screen C, the user rotates the head by 180 degrees. The head motion detecting section 151 detects the direction of the rotation of the head and the angle of the rotation thereof on the basis of detection values from the six-axis sensor 235, and the display controlling section 155 moves the position of the display region V in the spherical coordinate system in accordance with the direction of the rotation of the head and the angle of the rotation thereof detected by the head motion detecting section 151. In a case where the coordinates of the set content are present in the moved display region V, the display controlling section 155 causes the content to be displayed in the display region V. The user who faces in the direction corresponding to the angle of deviation $\phi$ of 180 degrees therefore allows the application screen A to be displayed in the display region V.

The description of the action of the HMD 100 will be resumed with reference to the flowchart shown in FIG. 17.

In the case where an application screen is displayed in the display region V in step S9, or in the case where a result of the evaluation in step S5 is negative, the control section 150 evaluates whether or not any head motion has been detected on the basis of detection values from the six-axis sensor 235 and the magnetic sensor 237 (step S10). In a case where a result of the evaluation is negative (NO in step S10), the control section 150 returns to the evaluation in step S5 and evaluates whether or not an application has been started (step S5).

In a case where a result of the evaluation in step S10 is affirmative (YES in step S10), the control section 150 evaluates whether or not any other application has been already started (step S11). In a case where a result of the evaluation is negative (NO in step S11), the control section 150 proceeds to the evaluation in step S13. In step S13, the control section 150 evaluates, on the basis of detection values from the six-axis sensor 235 and the magnetic sensor 237, whether or not the reference orientation needs to be set again. That is, in some cases, the user unintentionally moves the head and the direction of the set reference orientation is undesirably shifted. In a case where a result of the evaluation shows that the user's head has moved from the direction set as the reference orientation direction by at least a predetermined value, the control section 150 determines that the reference orientation needs to be set again. In a case where the user's head has not moved from the direction set as the reference orientation direction by at least the predetermined value, the control section 150 determines that the reference orientation does not need to be set again.

In a case where a result of the evaluation in step S13 is negative (NO in step S13), the control section 150 returns to the evaluation in step S5 and evaluates whether or not an application has been newly started. In a case where a result of the evaluation in step S13 is affirmative (YES in step S13), the control section 150 causes the image display section 20 to display a message stating "Reference orientation is set again" and proceeds to the evaluation in step S2.

In a case where a result of the evaluation in step S11 is affirmative (YES in step S11), that is, in a case where an application has been started, the control section 150 detects the direction of the rotation of the head and the angle of the rotation thereof on the basis of detection values from the six-axis sensor 235 and the magnetic sensor 237. The control section 150 then moves the position of the display region V in the spherical coordinate system in accordance with the detected direction of the rotation of the head and the detected angle of the rotation thereof. Thereafter, in a case where the coordinates of the set application screen are present in the moved display region V, the control section 150 causes the application screen to be displayed in the display region V (step S12).

The control section 150 then evaluates whether or not it has accepted application terminating operation (step S14). In a case where a result of the evaluation is negative (NO in step S14), the control section 150 returns to the evaluation in step S5 and evaluates whether or not an application has been newly started. In a case where a result of the evaluation in step S14 is affirmative (YES in step S14), the control section 150 terminates the application for which the control section 150 has accepted the terminating operation and cancels the relationship between the application screen displayed by the application and the coordinates in the spherical coordinate system. The control section 150 then evaluates whether or not every started applications has been terminated (step S15). In a case where a result of the evaluation is negative (NO in step S15), the control section 150 returns to the evaluation in step S5 and evaluates whether or not an application has been newly started. In a case where a result of the evaluation in step S15 is affirmative (YES in step S15), the control section 150 terminates the process procedure.

In the embodiment described above, the reference state is set on the basis of the position or motion of the head. Instead, the reference state may be set on the basis of the position or motion of the user's hand/finger or arm as the pointing element. For example the user may wear the operation device 3, in which the six-axis sensor and the magnetic sensor are incorporated, and the reference state may be set on the basis of detection values from the sensors in the operation device 3. Specifically, the user extends the arm on which the operation device 3 is worn in a direction that the user desires to set as the reference orientation. The operation device 3 transmits detection values from the six-axis sensor and the magnetic sensor to the HMD 100. The HMD 100 sets the reference orientation on the basis of the detection values transmitted from the operation device 3.

In the aforementioned description, the display region V is moved in the spherical coordinate system and a content to be displayed is determined. Instead, the position of the display region V may be fixed, and the spherical coordinate system is rotated in accordance with motion of the head. After the spherical coordinate system is rotated, a content located in the display region V may be identified.

To rotate spherical coordinate system, it may be rotated around the axis of rotation set through the head. The axis of rotation may be so set as to be perpendicular to the ground or may be set on the basis of the display surface of the operation device 3 worn by the user and the axis of rotation of the head. The axis of rotation around which the spherical coordinate system is rotated may be changed in accordance with a scene to be used.

The display magnification of a content displayed in the display region V may be changed on the basis of the position and motion of the user's hand/finger.

For example, a gesture dictionary for identifying a gesture based on the motion or position of the user's hand/finger is stored in the storage section 122 in advance. The HMD 100 detects a hand/finger region in which the user's hand/finger is seen on the basis of an image captured with the camera 61 and detects the motion, shape, and position of the hand/finger. The HMD 100 compares the detected motion, shape, and position of the hand/finger with information for identifying gestures registered in the gesture dictionary to identify the detected motion as a gesture. The HMD 100 carries out a process corresponding to the identified gesture. For example, in a case where the identified gesture is a gesture related to operation of increasing the display magnification, the HMD 100 changes the display magnification of the content displayed in the display region V and causes the content to be enlarged and displayed.

The aforementioned embodiment has been described with reference to the case where spherical coordinates are used as the coordinates set by the coordinate setting section 157, but the coordinate setting section 157 may set a columnar coordinate system located at a predetermined distance from the origin or the axis of rotation of the user's head. The coordinates set by the coordinate setting section 157 may be coordinates set in a plane located at a predetermined distance from the origin or the axis of rotation of the user's head. Further, the aforementioned embodiment has been described with reference to the spherical coordinate system that is rotational around the axis of rotation passing through the origin where the user is located, but the position of the origin may not coincide with the position of the axis of rotation.

In the embodiment described above, the position and motion of the head are detected on the basis of detection values from the six-axis sensor 235 and the magnetic sensor 237, and the display region V showing the display range of the image display section 20 is moved in the spherical coordinate system in correspondence with the detected motion of the head. As another method, the storage section 122 may store information on the history of the directions in which the user directed the head in the past, and the motion of the head may be predicted on the basis of the history information. The display controlling section 155 may select a content in accordance with a result of the prediction and display the selected content in the display region V.

As described above, the HMD 100 according to the present embodiment includes the image display section 20, the six-axis sensor 235, the magnetic sensor 237, and the head motion detecting section 151 as the detection section, the reference setting section 153, and the display controlling section 155.

The six-axis sensor 235, the magnetic sensor 237, and the head motion detecting section 151 as the detection section detect at least one of the position and motion of the head.

The reference setting section 153 sets the reference state on the basis of at least one of the head position and motion detected by the detection section. The display controlling section 155 changes the display state of a content displayed by the image display section 20 on the basis of changes in the head position and motion with respect to those in the reference state.

Further, the display controlling section 155 changes the display states of a plurality of contents displayed by the display section in such a way that the relative display positions of the contents are maintained.

Therefore, a content to be displayed can be readily selected, and the display state of the content can be changed through simple operation.

The HMD 100 further includes the storage section 122, which stores the display position information representing relative display positions of the plurality of contents.

The display controlling section 155 changes the display states of the plurality of contents in such a way that the relative display positions of the contents represented by the display position information are maintained. The display states of the contents displayed by the image display section 20 can therefore be so changed that the relative display positions of the plurality of contents are maintained.

The display controlling section 155 selects a content on the basis of changes in the position and motion of the head with respect to those in the reference state and causes the image display section 20 to display the selected content.

Therefore, a content can be selected on the basis of the position or motion of the head, and the selected content can be displayed by the image display section 20.

The reference setting section 153 sets, as the reference state, the axis of rotation of the head and the position of the head that rotates around the axis of rotation.

The HMD 100 further includes the coordinate setting section 157. The coordinate setting section 157 can set the display position of contents along the rotational direction around the axis of rotation and along the direction perpendicular to the rotational direction.

A plurality of contents can therefore be so set that the relative display positions of the plurality of contents are maintained.

The coordinate setting section 157 can set the display position of a content on the rear side of the head in the reference state. The display position of a content can therefore be changed in a variety of manners.

In the embodiment of the invention, the display controlling section can set the display position of a content on the rear side of the detection target section in the reference state.

According to the embodiment of the invention, the display position of a content can be changed in a variety of manners.

The coordinate setting section 157 can set the display positions of a plurality of contents in positions where the user can visually recognize the contents arranged on a spherical surface around a point on the axis of rotation or in a plane separate from the axis of rotation by a predetermined distance.

The display states of the plurality of contents can therefore be so changed that the relative display positions of the contents are maintained.

The display controlling section 155 can set the display position of a content in a position where the user can visually recognize the content disposed in the plane containing the user's feet.

The user is therefore allowed to visually recognize the content disposed in the plane containing the user's feet.

The image display section 20 includes the right display unit 22, which allows the user's right eye to visually recognize an image and the left display unit 24, which allows the user's left eye to visually recognize an image.

The display controlling section 155 causes a content to be displayed with parallax present between the right display unit 22 and the left display unit 24.

The content can therefore be displayed in a three-dimensional manner.

The reference setting section 153 sets the reference state in accordance with the position or motion of the pointing element. The reference state can therefore be readily set.

The display controlling section 155 sets the display magnification of a content in the image display section 20 in accordance with the position or motion of the pointing element.

The display magnification of a content can therefore be set through simple operation.

The display controlling section 155 causes the image display section 20 to display the content for input used for input operation performed on any of the contents.

Input operation can therefore be performed on a content via the content for input.

The reference setting section 153 sets, when it determines that the head has been stationary for at least a predetermined period, the position of the stationary head as the reference state.

The reference state will therefore not be set in a position where the user does not intend.

The HMD 100 further includes the sightline sensors 68, which detect the orientations of the user's sightlines. The reference setting section 153 sets the reference state including the position or motion of the head and the orientations of the sightlines detected with the sightline sensors 68.

The reference state can therefore be set in more detail in correspondence with the user's state.

The detection section is disposed in the enclosure of the image display section 20 and includes at least any of a GPS detection section that performs position detection on the basis of GPS signals, an acceleration sensor that detects acceleration, an angular acceleration sensor that detects angular acceleration, a monocular camera, a stereocamera, and a magnetic sensor.

The detection section can therefore detect the position or motion of the head with precision.

The magnetic sensor 237 is disposed on the side facing the outer surface of the enclosure of the image display section 20.

The influence of the enclosure on the magnetism detection performed by the magnetic sensor 237 can therefore be reduced.

The HMD 100 further includes the control section 150, which performs a plurality of functions, and each of the contents corresponds to the functions performed by the control section 150.

A content corresponding to the functions performed by the control section 150 can therefore be displayed by the image display section 20.

The control section 150 functions as the editing processing section that changes the substance of a content displayed by the image display section 20. The control section 150 can therefore change the substance of a content.

The display controlling section 155 causes a plurality of contents displayed by the image display section 20 to be displayed in the form of thumbnail images on the basis of changes in the position and motion of the head with respect to those in the reference state.

The user can therefore readily grasp the contents displayed by the image display section 20.

The display controlling section 155 predicts changes in the position and motion of the head with respect to those in the reference state and changes the display state of a content in accordance with a result of the prediction.

The display state of a content can therefore be changed at an early timing.

The display controlling section 155 causes the image display section 20 to display a plurality of contents in such a way that they are arranged in different positions in the direction extending from the near side toward the far side with respect to the head.

Contents displayed by the image display section 20 can therefore be displayed in a plurality of positions.

The invention is not limited to the configuration of the embodiment described above and can be implemented in a variety of aspects to the extent that the aspects do not depart from the substance of the invention.

For example, the aforementioned embodiment has been described with reference to the case where the control apparatus 10 is wired to the image display section 20, but not necessarily in the invention, and the image display section 20 may be wirelessly connected to the control apparatus 10. The wireless communication method in this case may be any of the methods exemplified as the communication methods handled by the communication section 117 or any other communication method.

In the embodiment described above, the position and motion of the head are detected by using the six-axis sensor 235 and the magnetic sensor 237. The position and motion of the head may be detected on the basis of the following information in addition to the sensors.

The position and motion of the head may be detected on the basis, for example, of the electric wave strength of GPS signals received by the GPS receiver 115, the electric wave strength of a beacon signal transmitted from a beacon signal transmitter (not shown), an image captured with the camera 61, and a detection value from a vibration detecting sensor. The position and motion of the head may be detected on the basis of the combination of detection values from the six-axis sensor 235, the magnetic sensor 237, and the vibration detection sensor, the electric wave strengths of the GPS signals and the beacon signal, the captured image, and other pieces of information.

The HMD 100 may include an interface (not shown) that connects a variety of external apparatus that serve as content supply sources. The interface may, for example, be an interface that supports wired connection, such as a USB interface, a micro-USB interface, and a memory card interface, and may instead be formed of a wireless communication interface. The external apparatus in this case are each an image supply apparatus that supplies the HMD 100 with images and are, for example, a personal computer (PC), a mobile phone terminal, and a mobile game console. In this case, the HMD 100 can output images and voice based on content data inputted from the external apparatus.

Part of the functions provided by the control apparatus 10 may be provided by the image display section 20, or the control apparatus 10 may be achieved by a plurality of apparatus. That is, the control apparatus 10 does not necessarily have the configuration including the box-shaped case 10A. For example, in place of the control apparatus 10, a wearable device that can be attached onto the user's body, the user's clothing, or an accessory worn by the user may be used. The wearable device in this case may, for example, be a timepiece-shaped apparatus, a finger-ring-shaped apparatus, a laser pointer, a mouse, an air mouse, a game controller, or a pen-shaped device.

Further, in the embodiment described above, the description has been made of the case where the image display section 20 is separated from the control apparatus 10 and they are connected to each other via the connection section 40, but not necessarily in the invention. The control apparatus 10 and the image display section 20 can instead be integrated with each other, and the integrated unit can be worn on the user's head.

The control apparatus 10 may be a notebook computer, a tablet computer, or a desktop computer. Instead, the control apparatus 10 may, for example, be a mobile electronic apparatus including a game console, a mobile phone, a smartphone, and a portable media player, or any other dedicated apparatus.

In the embodiment described above, the configuration in which the user views an outside scene through the display section is not limited to the configuration in which the right light guide plate 26 and the left light guide plate 28 transmit outside light. For example, the invention is also applicable to a display apparatus that displays an image but does not allow the user to visually recognize an outside scene. Specifically, the invention is applicable to a display apparatus that displays an image captured with the camera 61, an image and a CG produced on the basis of the captured image, video images based on prestored video data or externally inputted video data, and other images. An example of a display apparatus of this type may include a display apparatus that does not allow the user to visually recognize an outside scene or what is called a closed-type display apparatus. Further, the invention is applicable to a display apparatus that does not perform the display described above, that is, AR display, in which an image is so displayed as to be superimposed on the real space, or MR (mixed reality) display, in which a captured real space image is combined with an imaginary image. The invention is also applicable to a display apparatus that does not perform VR (virtual reality) display, in which a virtual image is displayed. Further, for example, a display apparatus that displays externally inputted video data or an analog video signal is, of course, an apparatus to which the invention is applied.

Further, for example, the image display section 20 may be replaced with an image display section worn, for example, as a cap or any other image display section worn based on a different method. A display section that displays an image in correspondence with the user's left eye LE and a display section that displays an image in correspondence with the user's right eye RE only need to be provided. Moreover, the display apparatus according to the embodiment of the invention may, for example, be configured as a head mounted display incorporated in an automobile, an airplane, and other vehicles. Further, for example, the display apparatus may be configured as a head mounted display built in a helmet or any other body protection gear. In this case, a portion that positions the display section relative to the user's body and a portion that is positioned relative to the positioning portion can be a portion worn by the user.

The configuration in which the half-silvered mirrors 261 and 281 form virtual images in part of the right light guide plate 26 and the left light guide plate 28 is presented as an example of the optical system that guides the image light to the user's eyes. The configuration described above does not necessarily employed in the invention, and a configuration in which an image is displayed in a display region having an area that occupies the entire or majority of each of the right light guide plate 26 and the left light guide plate 28 may be employed. In this case, the action of changing the position where an image is displayed may include the process of reducing the size of the image.

Further, the optical elements in the embodiment of the invention are not limited to the right light guide plate 26 and the left light guide plate 28 having the half-silvered mirrors 261 and 281 and only need to be optical parts that cause the image light to be incident on the user's eyes. Specifically, a diffraction grating, a prism, or a holography display section may be used.

At least part of the functional blocks shown in FIGS. 4 and 5 and other figures may be achieved by hardware or cooperation between hardware and software, and the configuration formed of the independent hardware resources shown in FIGS. 4 and 5 and other figures is not necessarily employed. Further, the program executed by the control section 150 may be stored in the nonvolatile storage section 121 or another storage device (not shown) in the control apparatus 10, or a program stored in an external apparatus may be acquired via the communication section 117 or the external connector 184 and executed. Among the configurations formed in the control apparatus 10, the operation section 110 may be formed as a user interface (UI).

The process units in the flowcharts shown in FIGS. 16 and 17 are those divided in accordance with primary processing contents for ease of understanding of the entire process carried out by the control section 10 of the HMD 100, and the invention is not limited by how to produce the divided process units or the name thereof. In accordance with the process contents, the entire process carried out by the control section 150 may be divided into a greater number of process units, or one process unit may further be divided into a large number of processes. The order in which the process units in the flowcharts described above are carried out is not limited to the order in the illustrated example.

The entire disclosure of Japanese Patent Application No. 2016-245704, filed Dec. 19, 2016 is expressly incorporated by reference herein.

What is claimed is:

1. A display apparatus comprising:
    a display section that is worn on a user's head;
    a detection section that detects at least one of a position and a motion of a detection target section including the head;
    a reference setting section that sets a current position of the detection target section as a reference state based on at least one of the position and motion of the detection target section currently detected by the detection section in response to an input received from the user; and
    a display controlling section that changes display states of contents displayed by the display section based on changes in the position and motion of the detection target section with respect to the position and motion of the detection target section in the reference state, wherein the display controlling section changes the display states of the contents displayed by the display section in such a way that relative display positions of a plurality of the contents are maintained, wherein the reference setting section is configured to (i) set a first reference orientation for a first orientation as the reference state, and (ii) set a second reference orientation for a second orientation other than the first orientation as the reference state, alternatively in response to the input received from the user, and wherein the contents displayed by the display section are located on a coordinate system based on one of the first reference orientation and the second reference orientation the coordinate system set so as to surround the detection target section.

2. The display apparatus according to claim 1,
further comprising a storage section that stores display position information representing the relative display positions of a plurality of the contents,
wherein the display controlling section changes the display states of the contents in such a way that the relative display positions of a plurality of the contents represented by the display position information are maintained.

3. The display apparatus according to claim 1, wherein the display controlling section selects one of the contents based on changes in the position and motion of the detection target section with respect to the position and motion of the detection target section in the reference state and causes the display section to display the selected content.

4. The display apparatus according to claim 1,
wherein the reference setting section sets the reference state based on an axis of rotation of the detection target section and the position of the detection target section that rotates around the axis of rotation, and
the display controlling section is capable of setting the display positions of the contents along a rotational direction around the axis of rotation and along a direction perpendicular to the rotational direction.

5. The display apparatus according to claim 4, wherein the display controlling section is capable of setting the display positions of the contents in positions where the user is allowed to visually recognize a plurality of the contents arranged on a spherical surface around a point on the axis of rotation or in a plane separate from the axis of rotation by a predetermined distance.

6. The display apparatus according to claim 4, wherein the display controlling section is capable of setting the display position of any of the contents in a position where the user is allowed to visually recognize the content disposed in a plane containing the user's feet.

7. The display apparatus according to claim 1,
wherein the display section includes a right display section that allows the user's right eye to visually recognize an image and a left display section that allows the user's left eye to visually recognize an image, and
the display controlling section causes any of the contents to be displayed with parallax present between the right display section and the left display section.

8. The display apparatus according to claim 1, wherein the reference setting section sets the reference state in accordance with a position or a motion of a pointing element.

9. The display apparatus according to claim 8, wherein the display controlling section sets a display magnification of any of the contents in the display section in accordance with the position or motion of the pointing element.

10. The display apparatus according to claim 1, wherein the display controlling section causes the display section to display a content for input used for input operation performed on any of the contents.

11. The display apparatus according to claim 1, wherein the reference setting section sets, when the reference setting section determines that the detection target section has been stationary for at least a predetermined period, the position of the stationary detection target section as the reference state.

12. The display apparatus according to claim 1,
further comprising a sightline detection section that detects orientations of the user's sightlines,
wherein the reference setting section sets the reference state including the position or motion of the detection target section and the orientations of the sightlines detected by the sightline detection section.

13. The display apparatus according to claim 1, wherein the detection section is disposed in an enclosure of the display section and includes at least any of a GPS detection section that performs position detection based on GPS signals, an acceleration sensor that detects acceleration, an angular acceleration sensor that detects angular acceleration, a monocular camera, a stereocamera, and a magnetic sensor.

14. The display apparatus according to claim 13, wherein the magnetic sensor is disposed on a side facing an outer surface of the enclosure of the display section.

15. The display apparatus according to claim 1, further comprising a processing section that performs a plurality of functions, wherein each of the contents corresponds to the functions performed by the processing section.

16. The display apparatus according to claim 1, further comprising an editing processing section that changes a substance of any of the contents displayed by the display section.

17. The display apparatus according to claim 1, wherein the display controlling section causes a plurality of the contents displayed by the display section to be displayed in a form of thumbnail images based on changes in the position and motion of the detection target section with respect to the position and motion of the detection target section in the reference state.

18. The display apparatus according to claim 1, wherein the display controlling section predicts changes in the position and motion of the detection target section with respect to the position and motion of the detection target section in the reference state and changes the display state of any of the contents in accordance with a result of the prediction.

19. The display apparatus according to claim 1, wherein the display controlling section causes the display section to display a plurality of the contents in such a way that the plurality of contents are arranged in different positions in a direction extending from a near side toward a far side with respect to the detection target section.

20. The display apparatus according to claim 1, wherein the first reference orientation and the second reference orientation are locations where a started application screen is located on in the coordinate system.

21. The display apparatus according to claim 1, wherein the coordinate system includes a rear side of the detection target section in the reference state.

22. A method for controlling a display apparatus including a display section that is worn on a user's head, the method comprising:
a detecting step of detecting at least one of a position and a motion of a detection target section including the head;

a setting step of setting a current position of the detection target section as a reference state based on at least one of the position and motion of the detection target section currently detected in the detecting step in response to an input received by the user; and a changing step of changing display states of contents displayed by the display section based on changes in the position and motion of the detection target section with respect to the position and motion of the detection target section in the reference state, wherein the display states of the contents displayed by the display section are so changed that relative display positions of a plurality of the contents are maintained, wherein the setting the current position of the detection target section as the reference state includes (i) setting a first reference orientation for a first orientation as the reference state, and (ii) setting a second reference orientation for a second orientation other than the first orientation as the reference state, alternatively in response to the input received from the user, and wherein the contents displayed by the display section are located on a coordinate system based on one of the first reference orientation and the second reference orientation the coordinate system set so as to surround the detection target section.

* * * * *